(12) United States Patent
Sakamoto

(10) Patent No.: US 12,093,323 B2
(45) Date of Patent: Sep. 17, 2024

(54) COMPUTER-READABLE RECORDING MEDIUM STORING INFORMATION MANAGEMENT PROGRAM, INFORMATION PROCESSING SYSTEM, AND INFORMATION MANAGEMENT METHOD

(71) Applicant: Fujitsu Limited, Kawasaki (JP)

(72) Inventor: Takuya Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/327,212

(22) Filed: Jun. 1, 2023

(65) Prior Publication Data
US 2024/0104142 A1 Mar. 28, 2024

(30) Foreign Application Priority Data
Sep. 22, 2022 (JP) .................... 2022-151892

(51) Int. Cl.
G06F 16/90 (2019.01)
G06F 16/904 (2019.01)
G06F 16/9532 (2019.01)
G06Q 50/163 (2024.01)

(52) U.S. Cl.
CPC ........ *G06F 16/904* (2019.01); *G06F 16/9532* (2019.01); *G06Q 50/163* (2013.01)

(58) Field of Classification Search
CPC .. G06F 16/904; G06F 16/9532; G06Q 50/163
USPC ...................................... 707/722
See application file for complete search history.

(56) References Cited

U.S. PATENT DOCUMENTS

| 8,185,448 | B1 | | 5/2012 | Myslinski | |
|---|---|---|---|---|---|
| 11,308,185 | B1 | * | 4/2022 | Paczkowski | H04L 9/50 |
| 11,368,420 | B1 | * | 6/2022 | Crook | G06F 8/31 |
| 11,687,575 | B1 | * | 6/2023 | Nguyen | G06N 3/08 |
| | | | | | 707/747 |

(Continued)

FOREIGN PATENT DOCUMENTS

| JP | 2006-202253 A | 8/2006 |
|---|---|---|
| JP | 2020-508518 A | 3/2020 |
| WO | 2018/156641 A1 | 8/2018 |

OTHER PUBLICATIONS

EESR—Extended European Search Report dated Feb. 8, 2024 for corresponding European Patent Application No. 23177217.9 [9 pages].

*Primary Examiner* — Hicham Skhoun
(74) *Attorney, Agent, or Firm* — Fujitsu Intellectual Property Center

(57) ABSTRACT

A non-transitory computer-readable recording medium storing an information management program that causes a computer to execute a process, the process includes referring to a management storage device that stores correspondence information that associates each post with a storage device that stores information related to each post and specifying a specific storage device that corresponds to a specific post from among a plurality of storage devices, in a case of receiving a browse request of specific property information that indicates certainty of the specific post uploaded over the Internet; referring to the specific storage device and determining whether the specific property information exists; and transmitting the specific property information to a transmission source of the browse request in a case of determining that the specific property information exists.

10 Claims, 29 Drawing Sheets

(56) References Cited

U.S. PATENT DOCUMENTS

| | | |
|---|---|---|
| 2012/0226646 A1 | 9/2012 | Donoho et al. |
| 2014/0164994 A1 | 6/2014 | Myslinski |
| 2015/0058750 A1* | 2/2015 | Chakra ................ G06F 40/284 |
| | | 715/753 |
| 2016/0275158 A1* | 9/2016 | Baset .................... G06F 16/248 |
| 2017/0195125 A1* | 7/2017 | Heppe ................... H04L 63/123 |
| 2017/0249389 A1* | 8/2017 | Brovinsky ............. G06Q 30/02 |
| 2020/0111014 A1 | 4/2020 | Myslinski |
| 2021/0397668 A1 | 12/2021 | Milazzo et al. |
| 2022/0114678 A1 | 4/2022 | Figueredo de Santana et al. |
| 2022/0207163 A1* | 6/2022 | Gentleman ............. G06F 21/62 |
| 2023/0136265 A1* | 5/2023 | Takiguchi ........... G06F 16/9558 |
| | | 715/234 |
| 2024/0013280 A1* | 1/2024 | Ding .................. G06Q 30/0631 |

* cited by examiner

FIG. 8

| IDENTIFICATION INFORMATION | URL |
|---|---|
| ID11 | https://example1.com/id11 |
| ID12 | https://example2.com/id12 |
| ID13 | https://example3.com/id13 |
| ... | ... |

| PROPERTY (1) | PROPERTY (2) | GENERATION ENTITY | IDENTIFICATION INFORMATION | DIGITAL SIGNATURE |
|---|---|---|---|---|
| FLOOD WARNING LEVEL OF ○○ RIVER: LOW | - | MR. W | ID21 | ... |

| IDENTIFICATION INFORMATION | RELATED IDENTIFICATION INFORMATION | CONTENT |
|---|---|---|
| ID11 | ID12 | ○○ RIVER NEARBY HOUSE IS FLOODED! |

| PROPERTY (1) | PROPERTY (2) | GENERATION ENTITY | IDENTIFICATION INFORMATION | DIGITAL SIGNATURE |
|---|---|---|---|---|
| POSTER: MR. Z | - | MR. Z | ID22 | ... |

| PROPERTY (1) | PROPERTY (2) | GENERATION ENTITY | IDENTIFICATION INFORMATION | DIGITAL SIGNATURE |
|---|---|---|---|---|
| AFFILIATION: E CITY HALL | - | E CITY | ID23 | ... |

| PROPERTY (1) | PROPERTY (2) | GENERATION ENTITY | IDENTIFICATION INFORMATION | DIGITAL SIGNATURE |
|---|---|---|---|---|
| ADDRESS: E CITY | - | E CITY | ID23 | ... |

| PROPERTY (1) | PROPERTY (2) | GENERATION ENTITY | IDENTIFICATION INFORMATION | DIGITAL SIGNATURE |
|---|---|---|---|---|
| IMAGING LOCATION: X CITY | IMAGING DATE AND TIME: Y | CAMERA B | ID24 | ... |

| PROPERTY (1) | PROPERTY (2) | GENERATION ENTITY | IDENTIFICATION INFORMATION | DIGITAL SIGNATURE |
|---|---|---|---|---|
| MANUFACTURER: C COMPANY | - | CAMERA MANUFACTURER C | ID25 | ... |

131f did:example:123456789abcdefghi  D0

FIG. 23

```
{
  "@context": "https://www.w3.org/ns/did/v1",
  "id": "did:example:123456789abcdefghi",
  "authentication": [{
    "id": "did:example:123456789abcdefghi#keys-1",
    "type": "Ed25519VerificationKey2018",
    "controller": "did:example:123456789abcdefghi",
    "publicKeyBase58": "H3C2AVvLMv6gmMNam3uVAjZpfkcJCwDwnZn6z3wXmqPV"
  }]
}
```

```
{
  "@context": "https://www.w3.org/ns/did/v1",
  "id": "did:example:123456789abcdefghi",
  "authentication": [{
    "id": "did:example:123456789abcdefghi#keys-1",
    "type": "Ed25519VerificationKey2018",
    "controller": "did:example:123456789abcdefghi",
    "publicKeyBase58": "H3C2AVvLMv6gmMNam3uVAjZpfkcJCwDwnZn6z3wXmqPV"
  }],
  "service": [{
    "id":"did:example:123456789abcdefghi#vcs",
    "type": "EndorsementService",
    "serviceEndpoint": "https://example.com/vc/"
  }]
}
```

D2

D2a

COMPUTER-READABLE RECORDING MEDIUM STORING INFORMATION MANAGEMENT PROGRAM, INFORMATION PROCESSING SYSTEM, AND INFORMATION MANAGEMENT METHOD

CROSS-REFERENCE TO RELATED APPLICATION

This application is based upon and claims the benefit of priority of the prior Japanese Patent Application No. 2022-151892, filed on Sep. 22, 2022, the entire contents of which are incorporated herein by reference.

FIELD

The embodiment discussed herein is related to a non-transitory computer-readable recording medium storing an information management program, an information processing system, and an information management method.

BACKGROUND

In recent years, with spread of smartphones and social networking services (SNS) over the Internet, it is possible to transmit and browse information regardless of time and places. However, there is a case where information transmitted in this way includes, for example, false information or incorrect information (hereinafter, also referred to as false information) that is intentionally spread, and the false information may be spread depending on a situation.

Therefore, from the viewpoint of suppressing the spread of the false information described above, for example, various methods to confirm certainty of a post over the Internet may be used.

Specifically, in a case where a viewer of the post (hereinafter, also simply referred to as viewer) browses the post as described above, for example, the viewer determines whether or not a poster is a reliable person by utilizing a method, an individual information processing system, or the like other than the Internet such as a prior contract. Then, for example, in a case of determining that the poster is a reliable person, the viewer determines that content of the post by the poster is probable.

Japanese Laid-open Patent Publication No. 2006-202253, Japanese National Publication of International Patent Application No. 2020-508518, U.S. Patent Application Publication No. 2020/0111014, and U.S. Patent Application Publication No. 2021/0397668 are disclosed as related art.

SUMMARY

According to an aspect of the embodiments, there is provided a non-transitory computer-readable recording medium storing an information management program that causes a computer to execute a process, the process includes referring to a management storage device that stores correspondence information that associates each post with a storage device that stores information related to each post and specifying a specific storage device that corresponds to a specific post from among a plurality of storage devices, in a case of receiving a browse request of specific property information that indicates certainty of the specific post uploaded over the Internet; referring to the specific storage device and determining whether or not the specific property information exists; and transmitting the specific property information to a transmission source of the browse request in a case of determining that the specific property information exists.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for explaining a specific example of correspondence information 132;

FIG. 9 is a diagram for explaining a specific example of property information 131;

FIG. 10 is a diagram illustrating a specific example of post identification information 133;

FIG. 12 is a diagram for explaining a specific example of the property information 131;

FIG. 13 is a diagram for explaining a specific example of the property information 131;

FIG. 14 is a diagram for explaining a specific example of the property information 131;

FIG. 15 is a diagram for explaining a specific example of the property information 131;

FIG. 16 is a diagram for explaining a specific example of the property information 131;

FIG. 23 is a diagram for explaining the information management processing according to the first modification;

FIG. 24 is a diagram for explaining the information management processing according to the first modification;

DESCRIPTION OF EMBODIMENTS

However, in a case where the method, the individual information processing system, or the like other than the Internet described above is utilized, for example, the viewer cannot directly determine certainty of each post over the Internet from content of each post. Therefore, for example, there is a case where the viewer cannot sufficiently confirm the certainty of each post.

Furthermore, for example, even in a case where information with which the certainty of each post can be determined exists over the Internet, there is a case where the viewer cannot specify a location of this information from content of each post and cannot easily confirm the certainty of each post.

Therefore, in one aspect, an object of the embodiment is to provide an information management program, an information processing system, and an information management method that can confirm certainty of a post uploaded over the Internet.

Figure 1:
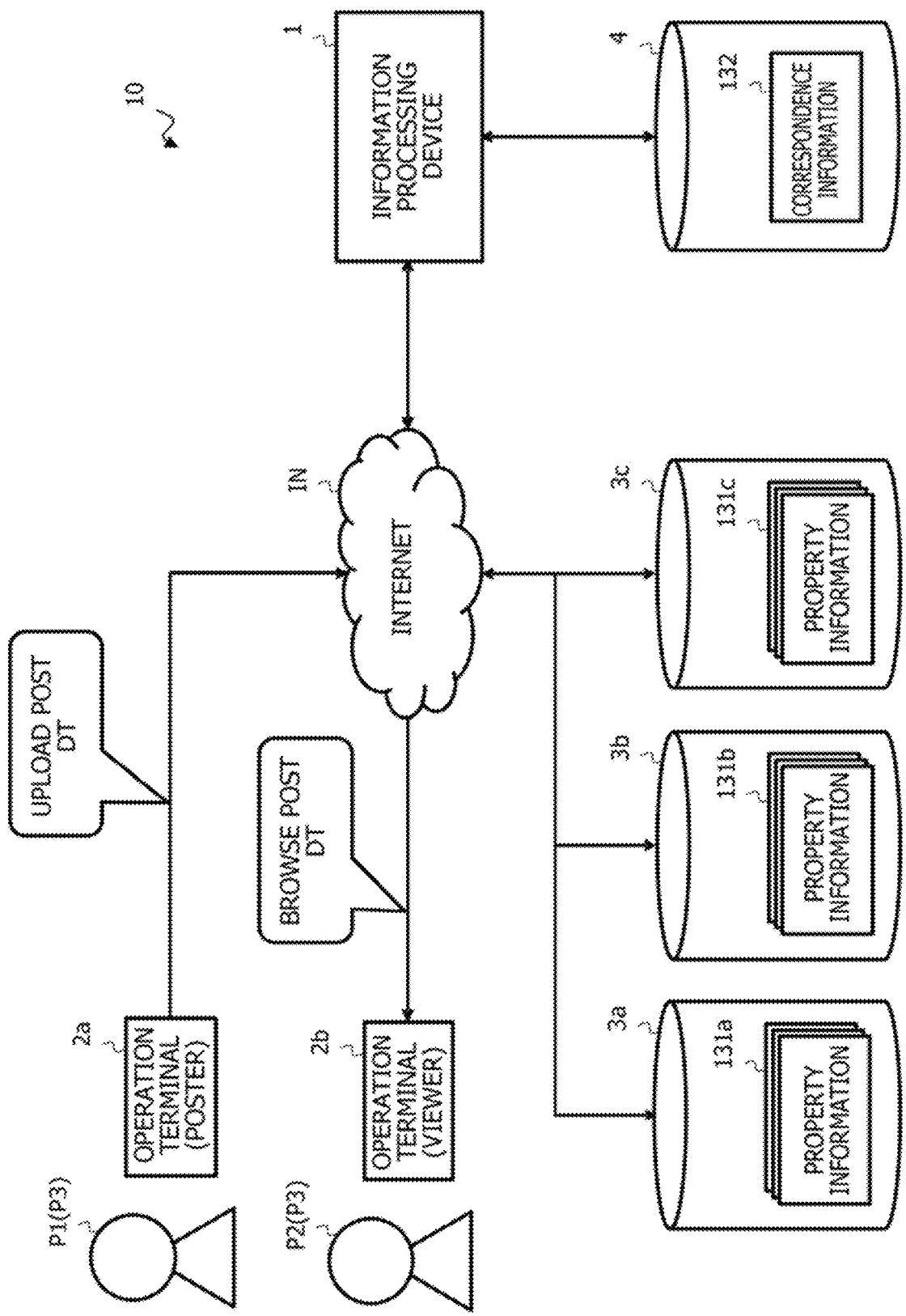
FIG. 1 is a diagram for explaining a configuration of an information processing system 10.

Configuration of Information Processing System According to First Embodiment First, a configuration of an information processing system 10 will be described. FIG. 1 is a diagram for explaining the configuration of the information processing system 10.

The information processing system 10 illustrated in FIG. 1 includes, for example, an information processing device 1, an operation terminal 2a, an operation terminal 2b, a storage device 3a, a storage device 3b, a storage device 3c, and a storage device 4 (hereinafter, referred to as management storage device 4). Hereinafter, the operation terminals 2a and 2b are collectively and simply referred to as an operation terminal 2. Furthermore, hereinafter, the storage devices 3a, 3b, and 3c are collectively and simply referred to as a storage device 3.

The operation terminal 2 is, for example, a terminal owned by a poster P1 or a viewer P2 and is a terminal that can access a content server (not illustrated) over the Internet IN.

In the example illustrated in FIG. 1, the operation terminal 2a is, for example, a terminal owned by the poster P1, and the poster P1 uploads a post DT to the content server over the Internet IN, for example. Specifically, the operation terminal 2a may be, for example, a smartphone or the like owned by the poster P1. Furthermore, for example, the operation terminal 2a can access the information processing device 1 via the Internet IN. Note that the post DT may be a sentence posted over the SNS, for example.

Furthermore, the operation terminal 2b is, for example, a terminal owned by the viewer P2 and browses the post DT uploaded on the content server over the Internet IN by the poster P1, for example. Specifically, the operation terminal 2b may be, for example, a smartphone owned by the viewer P2 or the like. Furthermore, for example, the operation terminal 2b can access the information processing device 1 via the Internet IN.

Note that, for example, there may be a case where the poster P1 browses a post uploaded by another poster (not illustrated) via the operation terminal 2a. Furthermore, for example, the viewer P2 may upload a post over the Internet IN via the operation terminal 2b. Moreover, hereinafter, a case will be described where the two operation terminals 2 (operation terminals 2a and 2b) are included in the information processing system 10. However, for example, three or more operation terminals 2 may be included in the information processing system 10.

The storage device 3 is, for example, a hard disk drive (HDD) or a solid state drive (SSD) and stores property information 131 that is added, by the poster P1, the viewer P2, or the like (hereinafter, also referred to as generation entity P3) to the post DT over the Internet IN uploaded by the poster P1. The generation entity P3 is, for example, a person or an object that generates the property information 131 and includes a person other than the poster P1 and the viewer P2 and a device that automatically generates the property information 131. Furthermore, the property information 131 is, for example, information used as a determination criterion when certainty of content of the post DT is determined. Specifically, the property information 131 is, for example, information indicating an attribute such as a holding qualification or an affiliation organization of the poster P1 of the post DT and information indicating an attribute of image data or the like included in the post DT (for example, imaging location or imaging date and time).

In the example illustrated in FIG. 1, each of the storage devices 3a to 3c stores, for example, each of property information 131a, property information 131b, and property information 131c that are generated by the generation entities P3 different from each other. In other words, in the example illustrated in FIG. 1, each piece of property information 131 is separately stored in the plurality of storage devices 3 (storage device 3a, storage device 3b, and storage device 3c). Note that, hereinafter, a case will be described where the three storage devices 3 (storage device 3a, storage device 3b, and storage device 3c) are included in the information processing system 10. However, for example, storage devices 3 of which the number is other than three may be included in the information processing system 10.

The storage device 4 stores, for example, correspondence information 132 indicating the storage device 3 that stores each piece of the property information 131. The correspondence information 132 is, for example, information that associates each post DT uploaded over the Internet IN with the storage device 3 that stores information related to each post DT (for example, property information 131 about each post DT). Furthermore, the correspondence information 132 is, for example, information that associates each generation entity P3 with the storage device 3 that stores information related to each generation entity P3 (for example, property information 131 about each generation entity P3). Specifically, the correspondence information 132 may be, for example, information that associates each post DT with a uniform resource locator (URL) used when accessing the property information 131 of each post DT. Furthermore, the correspondence information 132 may be, for example, information that associates each generation entity P3 with a URL used when accessing the property information 131 of each generation entity P3.

The information processing device 1 includes, for example, one or more physical machines or one or more virtual machines and executes processing for managing the property information 131 about the post DT (hereinafter, also referred to as information management processing).

Specifically, the information processing device 1 according to the present embodiment receives, for example, property information 131 (hereinafter, also referred to as specific property information 131) indicating certainty of the post DT uploaded over the Internet IN (hereinafter, also referred to as specific post DT) and a digital signature (hereinafter, also referred to as specific digital signature) generated from the specific property information 131. Then, for example, the information processing device 1 refers to the storage device 4 that stores the correspondence information 132 that associates each post DT with the storage device 3 that stores the information related to each post DT and specifies a storage device 3 (hereinafter, also referred to as specific storage device 3) corresponding to the specific post DT from among the plurality of storage devices 3. Thereafter, for example, the information processing device 1 stores the specific property information 131 to which identification information of the specific post DT and the specific digital signature are added, in the specific storage device 3.

Furthermore, for example, in a case of receiving a browse request of the specific property information 131 corresponding to the specific post DT, the information processing device 1 according to the present embodiment refers to the storage device 4 that stores the correspondence information 132 and specifies the specific storage device 3 corresponding to the specific post DT from among the plurality of storage devices 3. Then, for example, the information processing device 1 determines whether or not the specific property information 131 exists with reference to the specific storage device 3, and in a case of determining that the specific property information 131 exists, the information processing device 1 transmits the specific property information 131 to a transmission source of the browse request of the specific property information 131.

In other words, for example, the information processing device 1 according to the present embodiment secures authenticity and non-falsification property of each property information 131 by storing each piece of the property information 131 in a state where the digital signature generated by the generation entity P3 of each piece of the property information 131 is added. Furthermore, for example, the information processing device 1 according to the present embodiment stores each piece of the property information 131 in the storage device 3 determined according to the correspondence information 132 that has been generated in advance.

As a result, for example, in a case of browsing the post DT uploaded over the Internet IN, the viewer P2 can appropriately determine the certainty of the post DT, by referring to the property information 131 about the post DT. Furthermore, for example, even in a case where each piece of the property information 131 is separately stored in the plurality of storage devices 3, the viewer P2 can browse each piece of the property information 131.

Moreover, for example, in a case where another property information 131 (hereinafter, also simply referred to as another property information 131) corresponding to a person or an object related to the specific post DT has been already stored in the specific storage device 3, the information processing device 1 according to the present embodiment stores the specific property information 131 corresponding to the specific post DT and the another property information 131 in association with each other.

In other words, for example, when storing each piece of the property information 131 in the storage device 3, the information processing device 1 according to the present embodiment forms a graph structure by associating with another property information 131 about the generation entity P3 of each piece of the property information 131 and another property information 131 about an object of the post DT corresponding to each piece of the property information 131.

As a result, for example, even in a case where it is not possible to determine the certainty of each post DT from the content of the property information 131 about each post DT, the viewer P2 can retroactively confirm the other pieces of property information 131 related to each post DT in order and can determine the certainty of each post DT.

Specifically, for example, in a case of browsing a post DT including a sentence "The oo river nearby the house is flooded!", the viewer P2 also confirms property information 131 about the post DT (for example, property information 131 about image data included in post DT). Then, for example, in a case of determining that a location or a date and time written in the post DT and a location or a date and time included in the property information 131 (imaging location or imaging date and time of image data included in post DT) are close to each other, the viewer P2 can determine, for example, that content of the post DT is not false information.

On the other hand, for example, in a case where property information 131 including content indicating that a flood warning level of the oo river is low is associated with the post DT, the viewer P2 can determine that there is a possibility that the content of the post DT is false information, for example, by referring to the property information 131. Moreover, for example, in a case where a generation entity P3 of the property information 131 indicating the flood warning level of the oo river is a worker of an administrative organization (for example, organization that manages oo river), as a result of retroactively referring to the property information 131 (another property information 131) about the generation entity P3 of the property information 131 indicating the flood warning level of the oo river, the viewer P2 can determine that the content of the post DT is highly likely to be false information, for example.

[Hardware Configuration of Information Processing Device]

Figure 2:
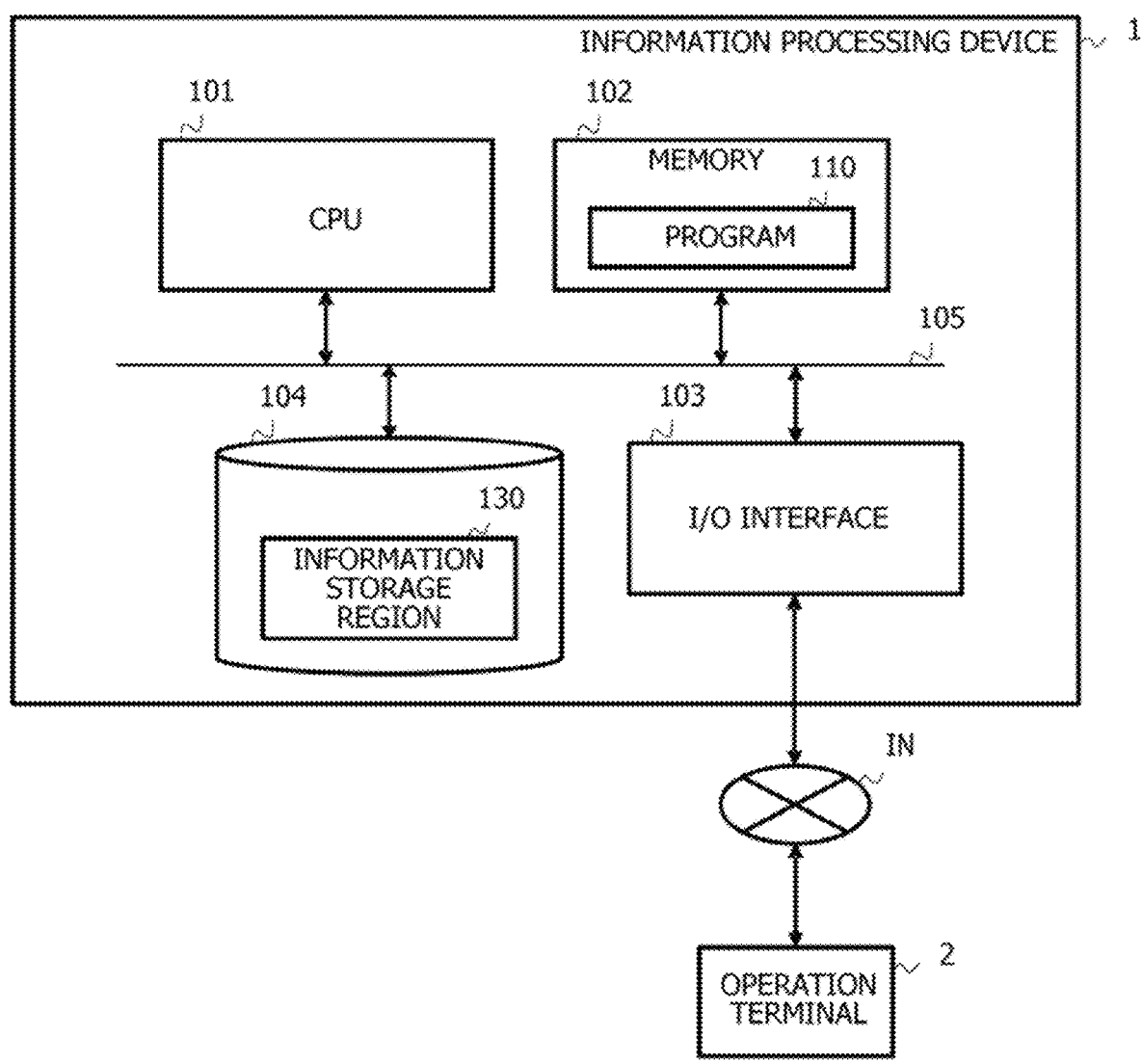
FIG. 2 is a diagram for explaining a hardware configuration of an information processing device 1.

Next, a hardware configuration of the information processing device 1 will be described. FIG. 2 is a diagram for explaining the hardware configuration of the information processing device 1.

As illustrated in FIG. 2, the information processing device 1 includes, for example, a central processing unit (CPU) 101 that is a processor, a memory 102, a communication device (input/output (I/O) interface) 103, and a storage 104. The units are coupled to each other via a bus 105.

The storage 104 includes, for example, a program storage region (not illustrated) that stores a program 110 for executing the information management processing. Furthermore, for example, the storage 104 includes an information storage region 130 that stores information used when the information management processing is executed. Note that the storage 104 may be, for example, an HDD or an SSD.

For example, the CPU 101 executes the program 110 loaded from the storage 104 to the memory 102 and executes the information management processing.

Furthermore, for example, the communication device 103 communicates with the operation terminal 2 and the storage device 3 via the Internet IN. Note that, for example, the communication device 103 may communicate with the storage device 4 via the Internet IN.

[Function of Information Processing Device According to First Embodiment]

Figure 3:
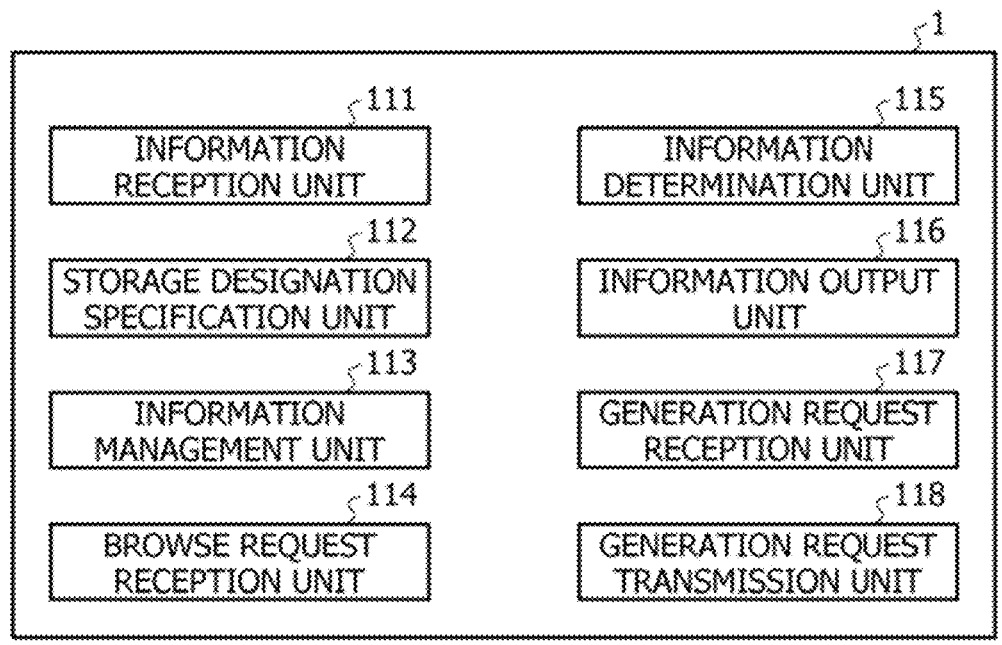
FIG. 3 is a diagram for explaining a function of the information processing device 1 according to a first embodiment.
Figure 4A:
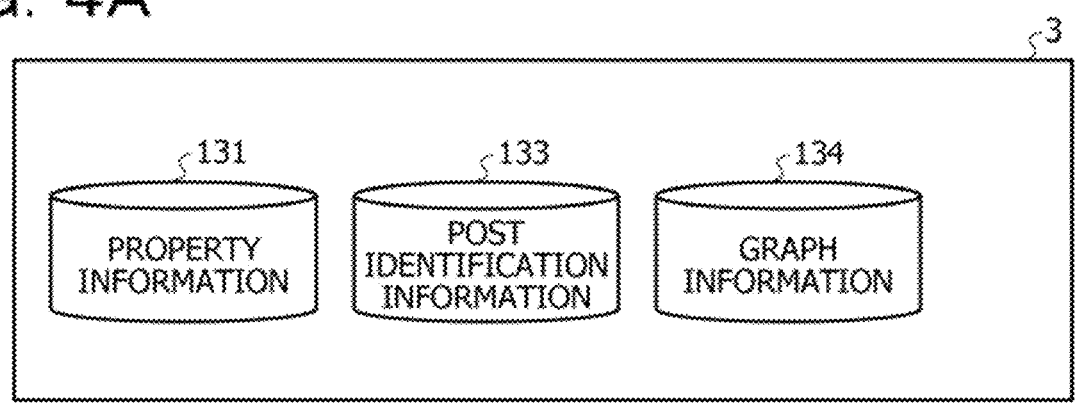
FIGS. 4A and 4B are diagrams for explaining information stored in storage devices 3 and 4 according to the first embodiment.
Figure 4B:

Next, a function of the information processing device 1 according to the first embodiment will be described. FIG. 3 is a diagram for explaining the function of the information processing device 1 according to the first embodiment. Furthermore, FIGS. 4A and 4B are diagrams for explaining information stored in the storage devices 3 and 4 according to the first embodiment. Specifically, FIG. 4A is a diagram for explaining the information stored in the storage device 3, and FIG. 4B is a diagram for explaining the information stored in the storage device 3.

As illustrated in FIG. 3, for example, hardware such as the CPU 101 or the memory 102 and the program 110 organically cooperate with each other so that the information processing device 1 implements various functions including an information reception unit 111, a storage destination specification unit 112, an information management unit 113, a browse request reception unit 114, an information determination unit 115, an information output unit 116, a generation request reception unit 117, and a generation request transmission unit 118.

Furthermore, as illustrated in FIG. 4A, for example, the storage device 3 stores the property information 131, the post identification information 133 (hereinafter, also simply referred to as identification information 133), and the graph information 134. Moreover, as illustrated in FIG. 4B, for example, the storage device 4 stores the correspondence information 132. Note that the graph information 134 will be described later.

First, a function in processing when the property information 131 is stored (add) in the storage device 3 (hereinafter, also referred to as addition processing), in the information management processing, will be described.

The information reception unit 111 receives, for example, the specific property information 131 about the specific post DT uploaded over the Internet IN and the specific digital signature generated for the specific property information 131 from the operation terminal 2. Specifically, the information reception unit 111 receives, for example, information in which the specific property information 131 transmitted by the generation entity P3 such as the poster P1 via the operation terminal 2 is associated with the specific digital signature.

For example, in a case where the information reception unit 111 receives the specific property information 131 and the specific digital signature, the storage destination specification unit 112 refers to the storage device 4 that stores the correspondence information 132 and specifies the specific storage device 3 corresponding to the specific post DT from among the plurality of storage devices 3.

For example, the information management unit 113 stores information associated with the specific property information 131 received from the information reception unit 111, the specific digital signature received from the information reception unit 111, and the post identification information 133 about the specific post DT, in the specific storage device 3 specified by the storage destination specification unit 112. The post identification information 133 is, for example, information used to identify each post DT that is information stored in the storage device 3 in advance by the content server to which each post DT is uploaded or information stored in the storage device 3 by the generation entity P3 of the property information 131 about each post DT.

Next, a function in processing when the property information 131 stored in the storage device 3 is browsed (hereinafter, also referred to as browsing processing), in the information management processing, will be described.

The browse request reception unit 114 receives, for example, information requesting to browse the specific property information 131 (hereinafter, also referred to as browse request information). The browse request information is, for example, information including the post identification information 133 corresponding to the specific property information 131. Specifically, for example, the browse request reception unit 114 receives the browse request information transmitted by the viewer P2 of the specific post DT via the operation terminal 2.

For example, the storage destination specification unit 112 specifies the storage device 3 corresponding to the post identification information 133 (post identification information 133 of specific post DT) included in the browse request information received by the browse request reception unit 114, by referring to the storage device 4 that stores the correspondence information 132, as the specific storage device 3 that stores the specific property information 131.

For example, the information determination unit 115 determines whether or not the specific property information 131 corresponding to the browse request information received by the browse request reception unit 114 is stored, by referring to the specific storage device 3 specified by the storage destination specification unit 112. In other words, for example, the information determination unit 115 searches for the specific property information 131 from the property information 131 stored in the storage device 3.

For example, in a case where the information determination unit 115 determines that the specific property information 131 is stored in the storage device 3, the information output unit 116 acquires the specific property information 131 from the storage device 3 and transmits the specific property information 131 to the operation terminal 2 (operation terminal 2 that has transmitted browse request information).

Note that, for example, in a case of acquiring the specific post DT from the Internet IN in response to the request of the viewer P2, the operation terminal 2 may automatically transmit the browse request information about the specific property information 131 to the information processing device 1. Then, for example, in a case of receiving the specific property information 131 transmitted from the information processing device 1, the operation terminal 2 may display the specific post DT and the specific property information 131 together on an output screen of the operation terminal 2.

Next, a function in processing when the property information 131 is generated (hereinafter, also referred to as generation processing), in the information management processing, will be described.

The generation request reception unit 117 receives, for example, information requesting to generate (add) the specific property information 131 (hereinafter, also referred to as generation request information). The generation request information is, for example, information including the post identification information 133 corresponding to the specific property information 131. Furthermore, the generation request information is, for example, information including a type of property information 131 requested to be generated. Specifically, for example, the generation request reception unit 117 receives the generation request information transmitted by the viewer P2 of the specific post DT via the operation terminal 2.

For example, the generation request transmission unit 118 transmits the generation request information received from the operation terminal 2, to a person or an object related to the specific post DT. Specifically, for example, the generation request transmission unit 118 transmits the generation request information received by the generation request reception unit 117 from the operation terminal 2 or information generated by processing the generation request information received by the generation request reception unit 117 from the operation terminal 2, to the generation entity P3 that has been stored in the specific storage device 3 or the like in advance as a generation entity P3 corresponding to the type of the property information 131 included in the generation request information.

Outline of Information Management Processing According to First Embodiment

Figure 5:
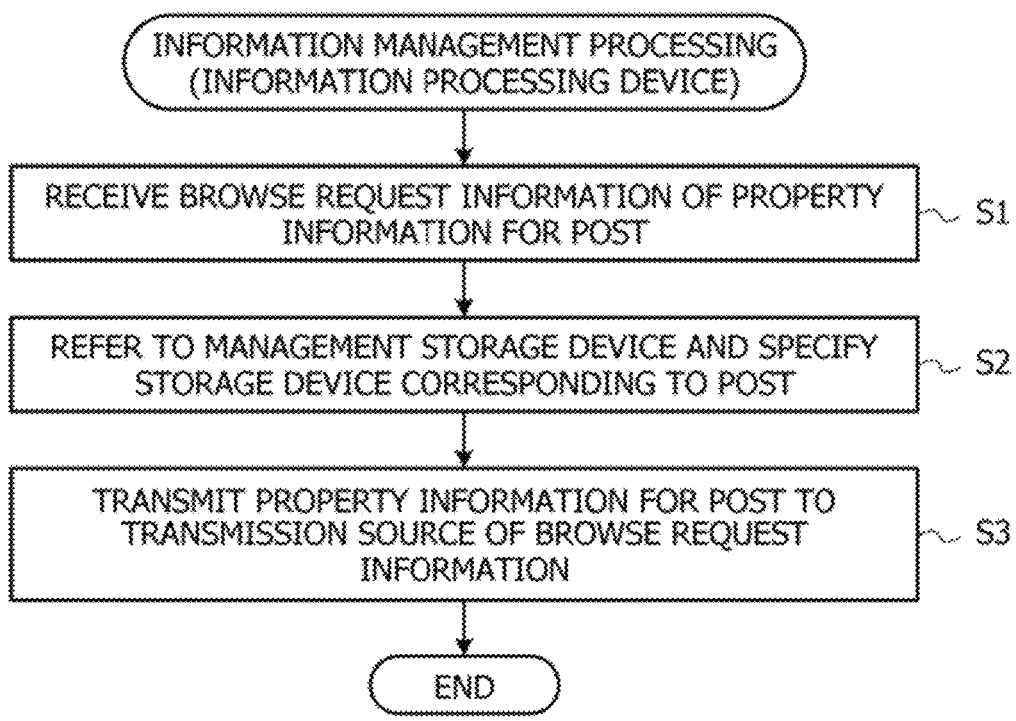
FIG. 5 is a flowchart for explaining an outline of information management processing according to the first embodiment.

Next, an outline of the first embodiment will be described. FIG. 5 is a flowchart for explaining the outline of the information management processing according to the first embodiment. Specifically, FIG. 5 is a flowchart for explaining the outline of the browsing processing according to the first embodiment.

As illustrated in FIG. 5, for example, the information processing device 1 receives the browse request information of the specific property information 131 indicating the certainty of the specific post DT uploaded over the Internet IN (S1). In other words, for example, the information processing device 1 receives the browse request information transmitted by the viewer P2 via the operation terminal 2b.

Then, for example, in a case of receiving the browse request information in the processing in S1, the information processing device 1 refers to the storage device 4 that stores the correspondence information 132 and specifies the specific storage device 3 corresponding to the specific post DT from among the plurality of storage devices 3 (S2).

Thereafter, the information processing device 1 refers to the specific storage device 3 and determines whether or not the specific property information 131 exists, and in a case of determining that the specific property information 131 exists, the information processing device 1 transmits the specific property information 131 to the transmission source of the browse request of the specific property information 131 (for example, operation terminal 2b) (S3).

As a result, for example, the viewer P2 can refer to the specific property information 131 about the specific post DT (specific property information 131 transmitted from information processing device 1 in processing in S3) with the operation terminal 2b, and can appropriately determine the certainty of the specific post DT.

Furthermore, for example, by specifying a location of each piece of the property information 131 by the information processing device 1, even in a case where each piece of the property information 131 is separately stored in the plurality of storage devices 3, the viewer P2 can browse each piece of the property information 131. Specifically, for example, even in a case where each piece of the property information 131 is stored in a state where the respective pieces of the property information 131 are distributed for respective affiliation organizations of the generation entities P3 such as companies or schools, the viewer P2 can browse each piece of the property information 131.

Details of Information Management Processing According to First Embodiment

Next, details of the information management processing according to the first embodiment will be described. Hereinafter, each of the addition processing, the browsing processing, and the generation processing according to the first embodiment will be described.

Addition Processing According to First Embodiment

Figure 6:
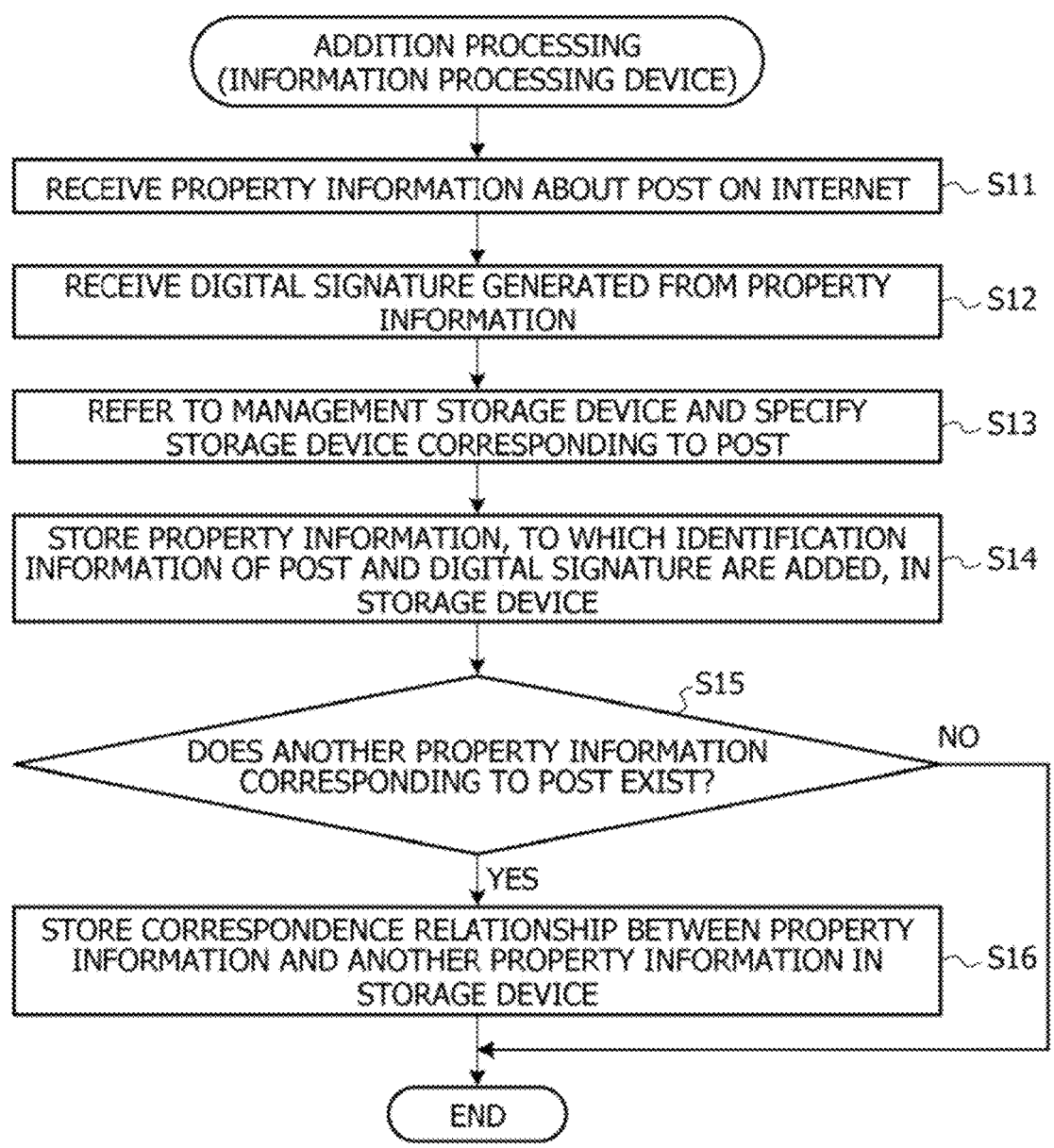
FIG. 6 is a flowchart for explaining addition processing according to the first embodiment.

First, the addition processing according to the first embodiment will be described. FIG. 6 is a flowchart for explaining the addition processing according to the first embodiment. Furthermore, FIG. 7 is a diagram for explaining the addition processing according to the first embodiment.

Figure 7:
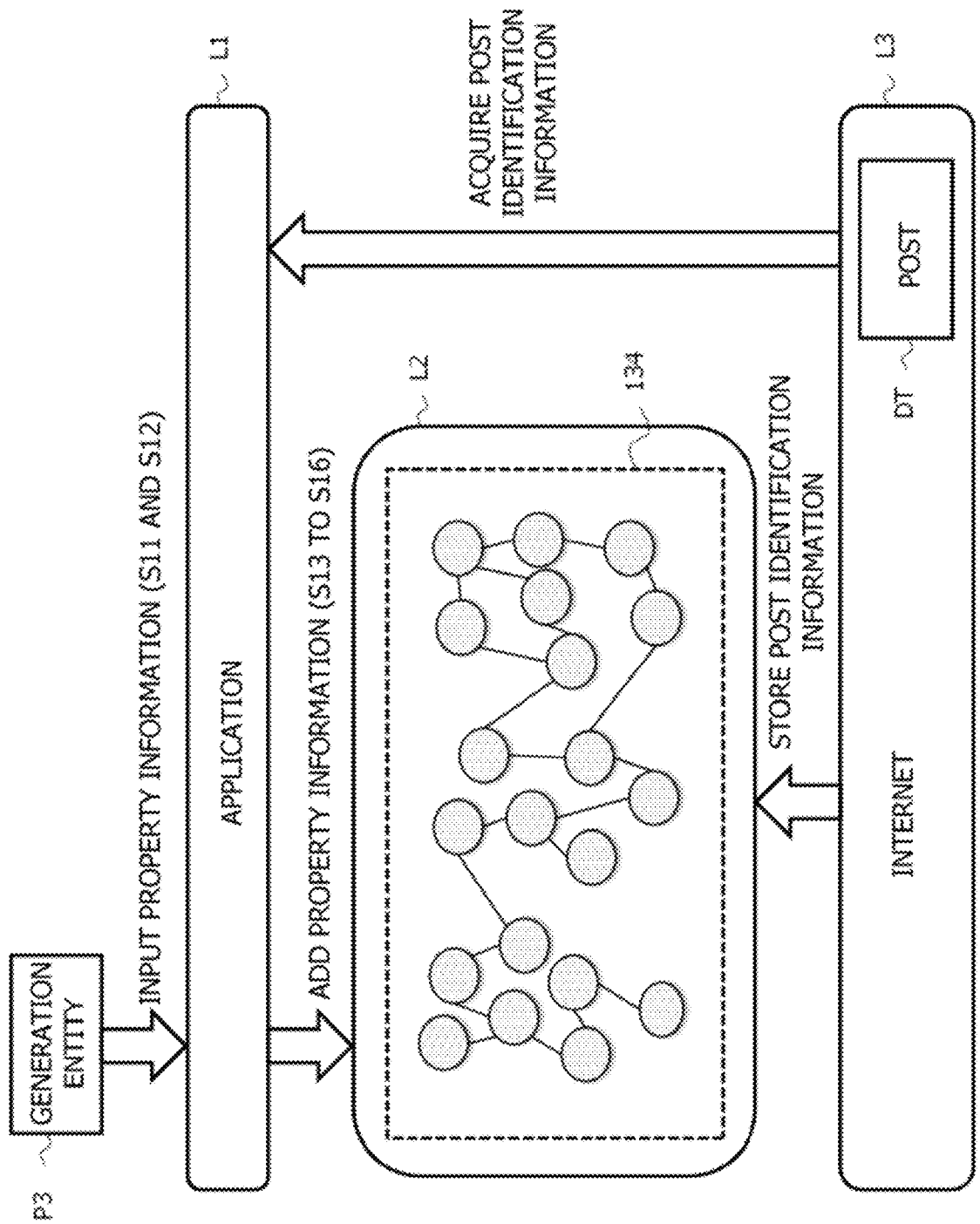
FIG. 7 is a diagram for explaining the addition processing according to the first embodiment.

Note that, hereinafter, as illustrated in FIG. 7 or the like, description will be made as assuming that a layer in which the operation terminal 2 executes each processing is an application layer L1. Furthermore, hereinafter, description will be made as assuming that a layer in which the information processing device 1 executes each processing, a layer in which the storage device 3 manages each piece of information such as the property information 131, and a layer in which the storage device 4 manages each piece of information such as the correspondence information 132 are endorsement layers L2. Moreover, hereinafter, description will be made as assuming that a layer in which a post DT is uploaded, download, or the like (for example, processing by content server) over the Internet IN is an Internet layer L3.

As illustrated in FIG. 6, for example, the information reception unit 111 receives the property information 131 transmitted from the operation terminal 2 (S11). Furthermore, for example, the information reception unit 111 receives the digital signature generated from the property information 131 by the operation terminal 2, from the operation terminal 2 (S12).

Then, for example, the storage destination specification unit 112 refers to the storage device 4 that stores the correspondence information 132 and specifies the storage device 3 associated with the post DT corresponding to the property information 131 received in the processing in S11 from among the plurality of storage devices 3 (S13). Specifically, for example, the storage destination specification unit 112 specifies the storage device 3 corresponding to the post identification information 133 transmitted together with the property information 131 in the processing in S11. Hereinafter, a specific example of the correspondence information 132 will be described.

Specific Example of Correspondence Information

FIG. 8 is a diagram for explaining the specific example of the correspondence information 132.

The correspondence information 132 illustrated in FIG. 8 includes, for example, "identification information" to which the identification information of each post DT (post identification information 133) is set and a "URL" to which a URL used when accessing each post DT is set as items.

Specifically, for example, in the correspondence information 132 illustrated in FIG. 8, in information in the first row, an "ID 11" is set as the "identification information" and "https://example 1.com/id11" is set as the "URL". In other words, the information in the first row indicates, for example, that a storage destination of property information 131 about a post DT of which "identification information" is the "ID 11" is a storage device 3 managed by a service corresponding to "example 1.com".

Furthermore, for example, in the correspondence information 132 illustrated in FIG. 8, in information in the second row, an "ID 12" is set as the "identification information" and "https://example 2.com/id12" is set as the "URL". In other words, the information in the second row indicates, for example, that a storage destination of property information 131 about a post DT of which "identification information" is the "ID 12" is a storage device 3 managed by a service corresponding to "example 2.com". Description of other information included in FIG. 8 is omitted.

Returning to FIG. 6, for example, the information management unit 113 stores information in which the post identification information 133 of the post DT corresponding to the property information 131 received in the processing in S11, the digital signature received in the processing in S12, and the property information 131 received in the processing in S11 are associated with each other, in the storage device 3 specified in the processing in S13 (S14).

Specifically, for example, in a case where the poster P1 has uploaded the post DT over the Internet IN, as illustrated in FIG. 7, the content server stores the post identification information 133 about the uploaded post DT in the storage device 3. Specifically, in this case, for example, the content server stores the post identification information 133 in the storage device 3 that stores the property information 131 about the uploaded post DT.

Then, for example, in a case of generating the property information 131 about the post DT, the generation entity P3 refers to the information included in the post DT using the operation terminal 2 and acquires the post identification information 133 about the post DT via the operation terminal 2. Subsequently, for example, after generating the property information 131 about the post DT, the generation entity P3 generates a digital signature that proves authenticity and non-falsification property of the generated property information 131. Moreover, for example, the generation entity P3 transmits the property information 131 in a state where the digital signature and the post identification information 133 about the post DT are added, from the operation terminal 2 to the information processing device 1. Note that the post identification information 133 about the post DT may be, for example, stored in the storage device 3 by the generation entity P3 that generates the property information 131 about the post DT.

Thereafter, for example, the information reception unit 111 receives the property information 131 transmitted from the operation terminal 2 (property information 131 to which digital signature and post identification information 133 about post DT are added) (S11 and S12). Then, for example, the storage destination specification unit 112 refers to the storage device 4 that stores the correspondence information 132 and specifies the storage device 3 that stores the property information 131 transmitted from the operation terminal 2 (S13). Thereafter, for example, the information management unit 113 stores the property information 131 received by the information reception unit 111, in the storage device 3 specified by the storage destination specification unit 112 (S14).

Returning to FIG. 6, for example, the information management unit 113 determines whether or not another property information 131 corresponding to the property information 131 received in the processing in S11 is stored in the storage device 3 specified in the processing in S13 (S15).

Specifically, for example, the information management unit 113 determines whether or not the another property information 131 about the generation entity P3 of the property information 131 received in the processing in S11 is stored in the storage device 3 specified in the processing in S13.

As a result, in a case of determining that the another property information 131 corresponding to the property information 131 received in the processing in S11 is stored (YES in S15), for example, the information management unit 113 stores the property information 131 received in the processing in S11 and the another property information 131 that is determined to be stored in the storage device 3 in the processing in S15 in association with each other, in the storage device 3 specified in the processing in S13 (S16).

Specifically, as illustrated in FIG. 7, for example, the information management unit 113 generates the graph information 134 having a graph structure of information including the property information 131, by associating the property information 131 received in the processing in S11 with the another property information 131 related to the property information 131 received in the processing in S11.

On the other hand, in a case of determining that the another property information 131 corresponding to the property information 131 received in the processing in S11 is not stored (NO in S15), the information management unit 113 does not execute the processing in S16, for example. Hereinafter, specific examples of the property information 131 and the post identification information 133 will be described.

Specific Example of Property Information

First, the specific example of the property information 131 will be described. FIGS. 9, 12, 13, 14, 15, and 16 are diagrams for explaining the specific examples of the property information 131. Specifically, FIG. 9 is a diagram for explaining a specific example of the property information 131 (hereinafter, also referred to as property information 131a) corresponding to the post DT (hereinafter, also referred to as post DTa) including the sentence "The oo river nearby the house is flooded!".

The property information 131 illustrated in FIG. 9 or the like includes, for example, a "property (1)" and a "property (2)", to which a plurality of properties included in each piece of the property information 131 are set, as items. Furthermore, the property information 131 illustrated in FIG. 9 or the like includes, for example, a "generation entity" to which a name of the generation entity P3 of each piece of the property information 131 is set, "identification information" to which identification information of the generation entity P3 of each piece of the property information 131 is set, and a "digital signature" to which a digital signature of each piece of the property information 131 (encrypted data generated from each piece of property information 131) is set, as items. Note that, hereinafter, description will be made as assuming that "-" is set to an item to which information is not set. Furthermore, hereinafter, a case will be described where two properties are set to each piece of the property information 131. However, for example, three or more properties may be set to each piece of the property information 131.

Specifically, to the property information 131a illustrated in FIG. 9, for example, content indicating "flood warning level of oo river: low" is set as the "property (1)", "-" is set as the "property (2)", "Mr. W" is set as the "generation entity", and an "ID 21" is set as the "identification information".

Specific Example of Post Identification Information

Next, a specific example of the post identification information 133 will be described. FIG. 10 is a diagram illustrating the specific example of the post identification information 133. Specifically, FIG. 10 is a diagram illustrating a specific example of post identification information 133 corresponding to the post DTa (hereinafter, also referred to as post identification information 133a).

The post identification information 133a illustrated in FIG. 10 includes, for example, "identification information" to which identification information of the post DTa is set, "related identification information" to which identification information (hereinafter, also referred to as related identification information) of image data (hereinafter, also referred to as image A) included in the post DTa is set, and "content" to which content of the post DTa is set, as items. Note that, for example, the post identification information 133 does not need to include the "content".

Specifically, to the post identification information 133a illustrated in FIG. 10, for example, an "ID 11" is set as the "identification information", an "ID 12" is set as the "related identification information", and a sentence "The 00 river nearby the house is flooded!" is set as the "content".

Then, for example, the information management unit 113 stores the property information 131a and the post identification information 133a in the storage device 3 in an associated state in the processing in S14 so as to manage the property information 131a and the post DTa in an associated state.

As a result, for example, when browsing the post DTa, the viewer P2 can also refer to the property information 131a about the post DTa, and can determine certainty of the post DTa.

Specifically, the property information 131a illustrated in FIG. 9 indicates, for example, that the flood warning level of the oo river is low and has content different from the post DTa including the sentence "The oo river nearby the house is flooded!". Therefore, for example, by referring to the property information 131a together with the post DTa, the viewer P2 can determine that the content of the post DTa does not match the content of the property information 131a. Therefore, for example, in a case of determining that Mr. W who is the generation entity P3 of the property information 131a is a reliable person, the viewer P2 can determine that the content of the property information 131a is highly likely to be content, and can retroactively determine that the post DTa is highly likely to be false information.

Moreover, the property information 131a illustrated in FIG. 9 includes, for example, the identification information of the generation entity P3. Therefore, for example, in a case where it is not possible to determine whether or not Mr. W who is the generation entity P3 of the property information 131a is a reliable person, the viewer P2 can further refer to property information 131 about Mr. W, based on the identification information of the generation entity P3 included in the property information 131a. Therefore, in this case, by referring to the property information 131 about Mr. W, the viewer P2 can determine whether or not the post DTa is false information. Hereinafter, a specific example of the graph information 134 will be described.

Specific Example of Graph Information

Figure 11:
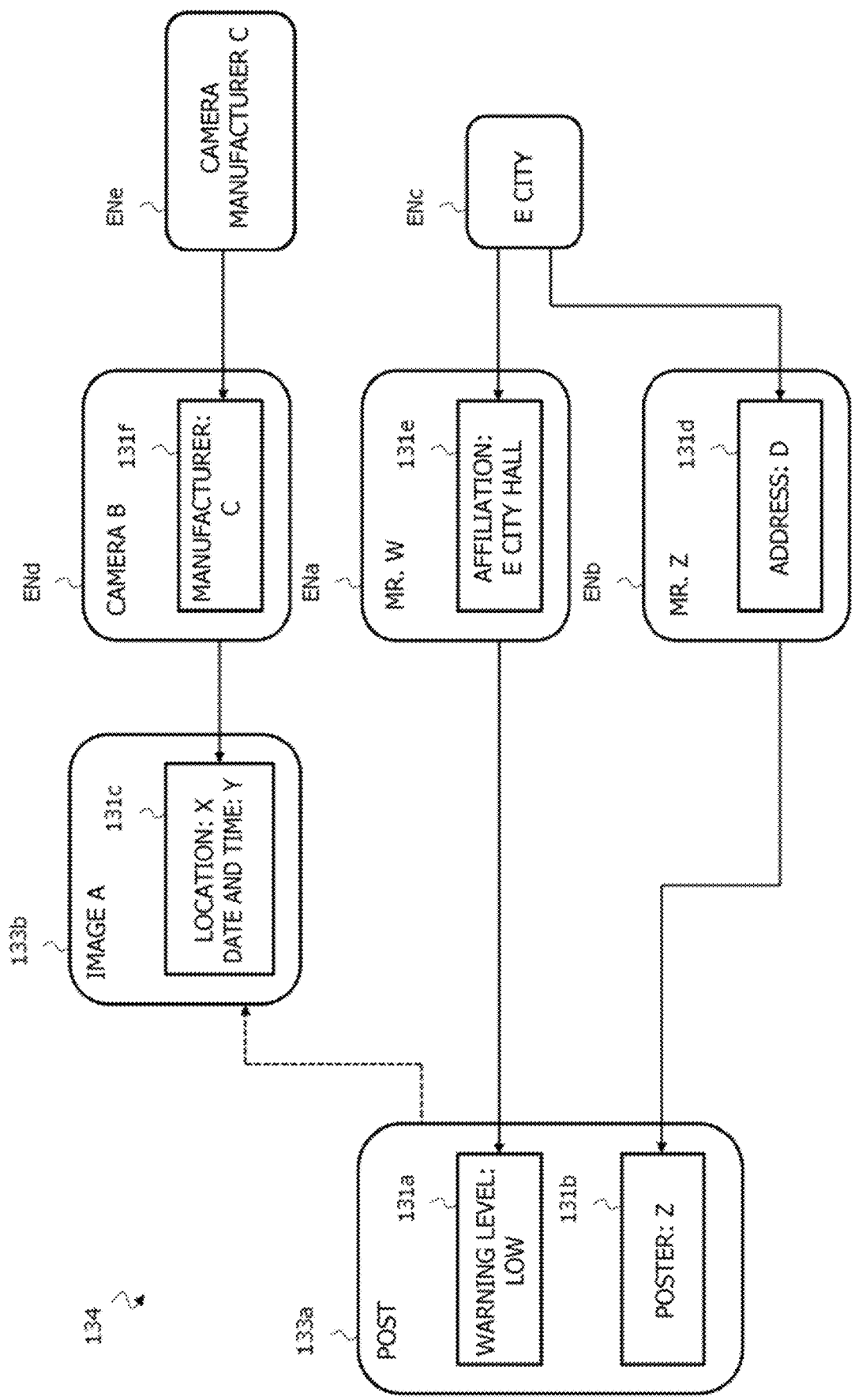
FIG. 11 is a diagram for explaining a specific example of graph information 134.

FIG. 11 is a diagram for explaining the specific example of the graph information 134. For example, the graph information 134 is information having a graph structure including a plurality of pieces of property information 131 and a plurality of entities respectively indicating generation entities P3 of the plurality of pieces of property information 131. Hereinafter, description will be made as assuming that property information 131a in FIG. 11 corresponds to the property information 131a described with reference to FIG. 9. Furthermore, hereinafter, description will be made as assuming that post identification information 133a in FIG. 11 corresponds to the post identification information 133a described with reference to FIG. 10.

In the graph information 134 illustrated in FIG. 11, for example, the property information 131a and the property information 131b are associated, as the property information 131 for the post DTa (post identification information 133a). Then, the property information 131a illustrated in FIG. 11 is associated with, for example, an entity ENa indicating that the generation entity P3 of the property information 131a is Mr. W. Furthermore, the property information 131b illustrated in FIG. 11 is associated with, for example, an entity ENb indicating that the generation entity P3 of the property information 131b is Mr. Z.

Specifically, to the property information 131b, as illustrated in FIG. 12, for example, the "poster: Mr. Z" is set as the "property (1)", "-" is set as the "property (2)", "Mr. Z" is set as the "generation entity", and an "ID 22" is set as the "identification information".

In other words, for example, the property information 131b illustrated in FIG. 12 is property information 131 generated by Mr. Z who is the poster P1 of the post DTa, in order to enhance reliability of the content of the post DTa.

Furthermore, in the graph information 134 illustrated in FIG. 11, for example, property information 131e is associated as the property information 131 about the entity ENa. Then, the property information 131e illustrated in FIG. 11 is associated with, for example, an entity ENc indicating that a generation entity P3 of the property information 131e is E city.

Specifically, as illustrated in FIG. 13, for example, to the property information 131e, "affiliation: E city hall" is set as the "property (1)", "-" is set as the "property (2)", "E city" is set as the "generation entity", and an "ID 23" is set as the "identification information".

In other words, for example, the property information 131e illustrated in FIG. 13 indicates that Mr. W is an employee of E city and is property information 131 generated by E city.

Then, for example, at the time of browsing the post DTa, in a case where the viewer P2 of the post DTa cannot determine whether or not Mr. W is a reliable person even if the viewer P2 refers to the property information 131a, the viewer P2 further refers to the property information 131e based on the identification information of the generation entity P3 included in the property information 131a. As a result, for example, in a case where it is determined that Mr. W is a reliable person since E city guarantees that Mr. W is the employee of E city hall, the viewer P2 of the post DTa can retroactively determine that the content of the post DTa is highly likely to be incorrect, for example.

Furthermore, in the graph information 134 illustrated in FIG. 11, for example, property information 131d is associated as the property information 131 about the entity ENb. Then, the property information 131d illustrated in FIG. 11 is associated with, for example, the entity ENc indicating that a generation entity P3 of the property information 131d is E city.

Specifically, as illustrated in FIG. 14, for example, to the property information 131d, "address: E city" is set as the "property (1)", "-" is set as the "property (2)", "E city" is set as the "generation entity", and an "ID 23" is set as the "identification information".

In other words, the property information 131d illustrated in FIG. 14 indicates, for example, that Mr. Z is a resident of E city and is property information 131 generated by E city.

Then, for example, at the time of browsing the post DTa, in a case where the viewer P2 of the post DTa cannot determine whether or not Mr. Z is a reliable person even if the viewer P2 refers to the property information 131*b*, the viewer P2 further refers to the property information 131*d* based on the identification information of the generation entity P3 included in the property information 131*b*. As a result, for example, in a case where it is determined that Mr. Z is a reliable person, for example, the viewer P2 of the post DTa retroactively determines that the content of the post DTa is highly likely to be content.

Furthermore, in the graph information 134 illustrated in FIG. 11, for example, the property information 131*c* is associated as property information 131 for image data (post identification information 133*b*) included in the post DTa. Then, the property information 131*c* illustrated in FIG. 11 is associated with, for example, an entity ENd indicating that a generation entity P3 of the property information 131*c* is a camera B.

Specifically, as illustrated in FIG. 15, for example, to the property information 131*c*, an "imaging location: X city" is set as the "property (1)", an "imaging date and time: Y" is set as the "property (2)", the "camera B" is set as the "generation entity", and an "ID 24" is set as the "identification information".

In other words, the property information 131*c* illustrated in FIG. 15 indicates, for example, that image data included in the post DTa is image data imaged in X city when the date and time is Y and is property information 131 generated by the camera B.

Furthermore, in the graph information 134 illustrated in FIG. 11, for example, property information 131*f* is associated as the property information 131 about the entity ENd. Then, the property information 131*f* illustrated in FIG. 11 is associated with, for example, an entity ENe indicating that a generation entity P3 of the property information 131*f* is a camera manufacturer C.

Specifically, as illustrated in FIG. 16, for example, to the property information 131*f*, a "manufacturer: company C" is set as the "property (1)", "-" is set as the "property (2)", and the "camera manufacturer C" is set as the "generation entity", and an "ID 25" is set as the "identification information".

Then, for example, in a case where it is not possible to determine whether or not the camera B is a reliable device even if the viewer P2 refers to the property information 131*c* at the time of browsing the post DTa (for example, in a case where it is not possible to determine whether or not device can falsify imaging location of image data included in post DTa), the viewer P2 of the post DTa further refers to the property information 131*f* specified from the identification information of the generation entity P3 included in the property information 131*c*. As a result, for example, in a case where it is determined that the camera B is a reliable device since the function of the camera B is guaranteed by the camera manufacturer C, the viewer P2 of the post DTa retroactively determines that the content of the post DTa is highly likely to be content, for example.

In this way, for example, when the viewer P2 of the post DT confirms the certainty of the post DT, the information processing device 1 according to the present embodiment accumulates each of the pieces of property information 131 related to each other in the storage device 3 in a form of the graph structure that can be retroactively referred.

As a result, for example, when browsing each post DT, by sequentially referring to each of the pieces of property information 131 related to each post DT, the information processing device 1 according to the present embodiment can confirm the certainty of each post DT.

Browsing Processing According to First Embodiment

Figure 17:
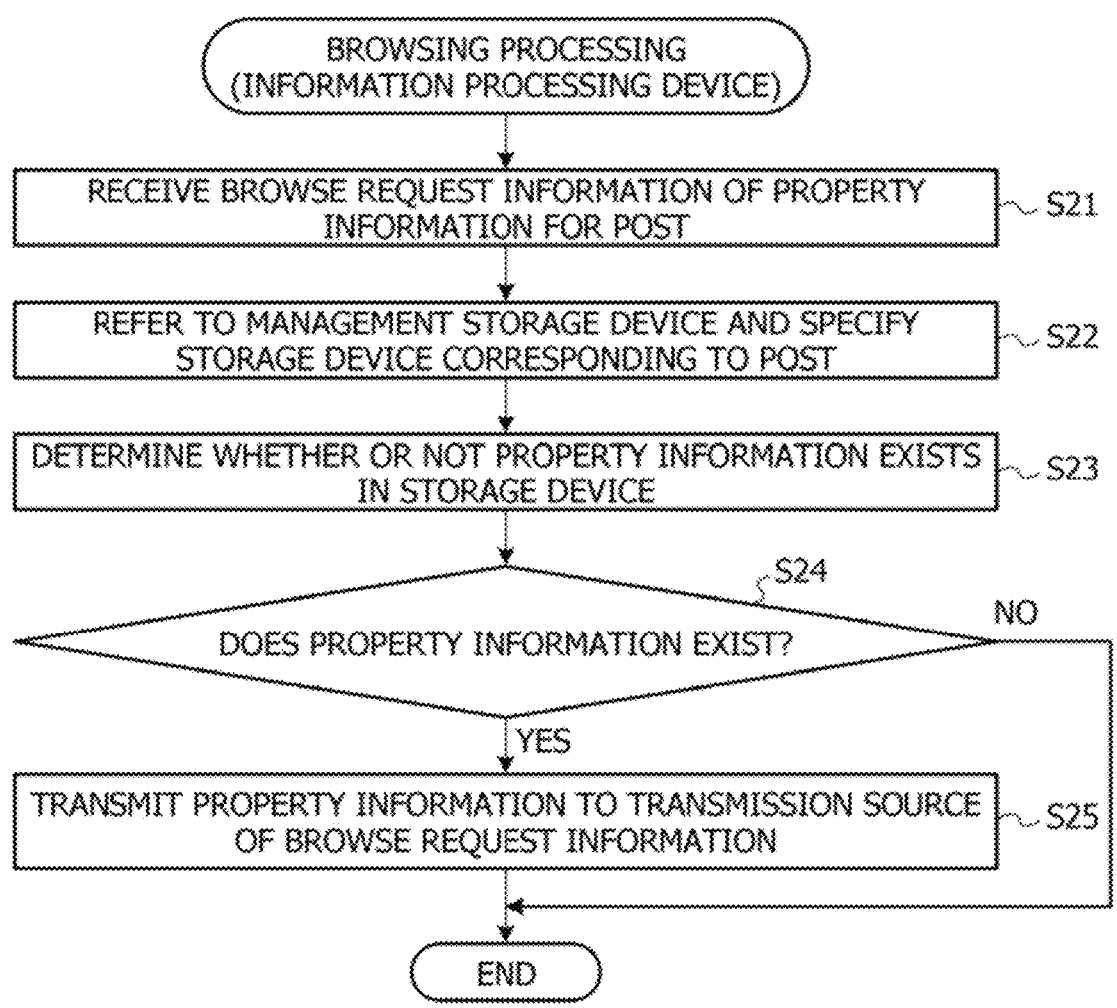
FIG. 17 is a flowchart for explaining browsing processing according to the first embodiment.

Next, the browsing processing according to the first embodiment will be described. FIG. 17 is a flowchart for explaining the browsing processing according to the first embodiment. Furthermore, FIG. 18 is a diagram for explaining the browsing processing according to the first embodiment.

As illustrated in FIG. 17, for example, the browse request reception unit 114 receives browse request information about property information 131 transmitted from the operation terminal 2 (S21).

Figure 18:
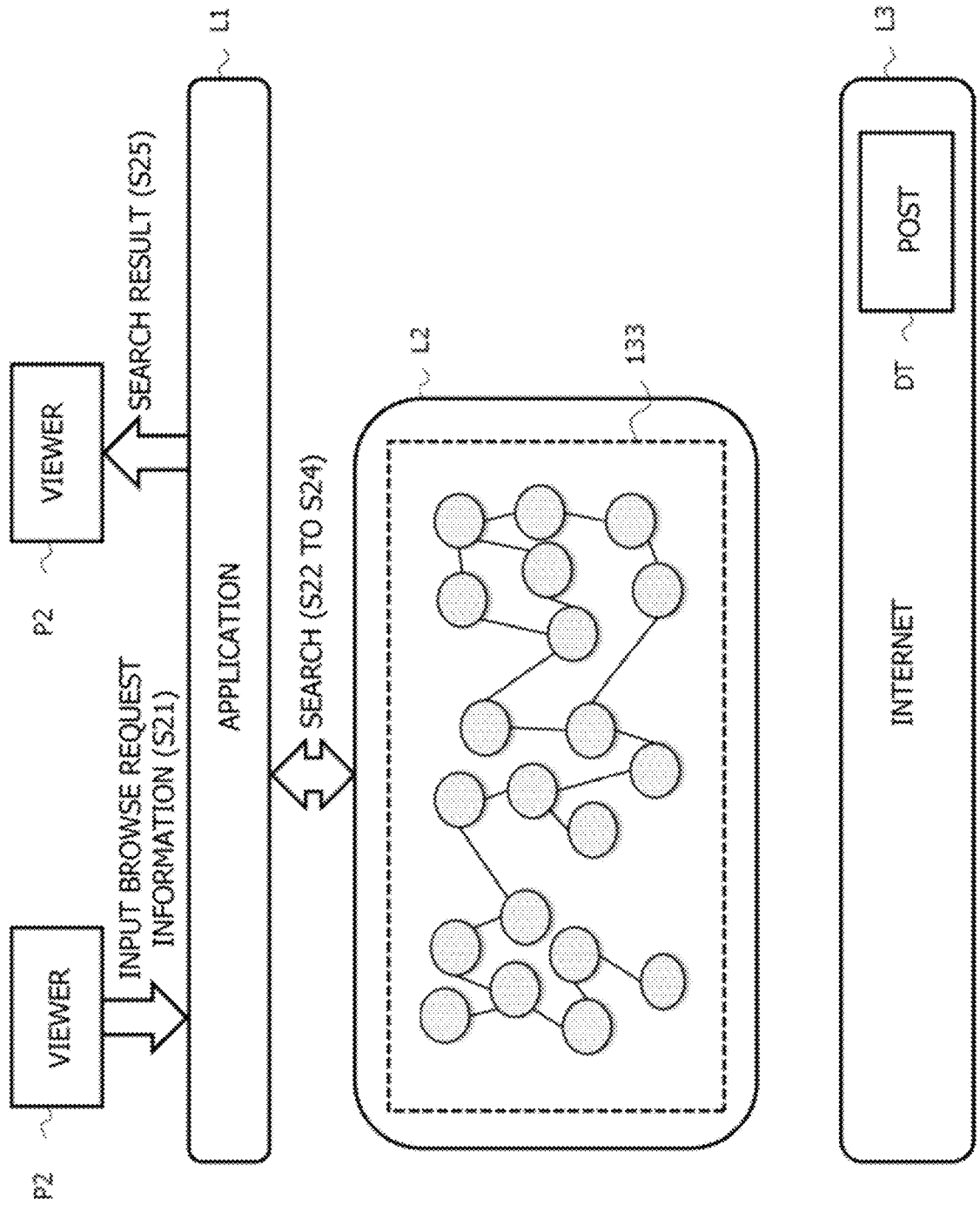
FIG. 18 is a diagram for explaining the browsing processing according to the first embodiment.

Specifically, as illustrated in FIG. 18, for example, in a case where it is not possible to determine whether or not content of a post DT is probable, the viewer P2 of the post DT inputs the browse request information about property information 131 corresponding to the post DT from the operation terminal 2 into the information processing device 1.

Then, for example, the storage destination specification unit 112 refers to the storage device 4 that stores the correspondence information 132 and specifies a storage device 3 corresponding to the browse request information received in the processing in S21 (S22). Specifically, for example, the storage destination specification unit 112 specifies a storage device 3 corresponding to post identification information 133 included in the browse request information received in the processing in S21.

Thereafter, for example, the information determination unit 115 accesses the storage device 3 specified in the processing in S22 and determines whether or not the property information 131 corresponding to the browse request information received in the processing in S21 is stored (S23).

Specifically, as illustrated in FIG. 18, for example, the information determination unit 115 searches for the property information 131 corresponding to the post identification information 133 included in the browse request information, from among respective pieces of property information 131 included in graph information 134 stored in the storage device 3 specified in the processing in S22.

As a result, for example, in a case where it is determined that the property information 131 corresponding to the browse request information received in the processing in S21 is stored (YES in S24), the information output unit 116 acquires the property information 131 corresponding to the browse request information received in the processing in S21 from the storage device 3 (storage device 3 specified in processing in S22) and transmits the acquired property information 131 to the operation terminal 2 (operation terminal 2 that has transmitted browse request information received in processing in S21) (S25).

Specifically, as illustrated in FIG. 18, for example, the information output unit 116 transmits the property information 131 (search result of property information 131) corresponding to the post identification information 133 included in the browse request information, to the operation terminal 2.

Thereafter, for example, the operation terminal 2 displays the property information 131 transmitted from the information processing device 1 (property information 131 corresponding to browse request information) on an output screen.

On the other hand, for example, in a case where it is determined that the property information 131 corresponding to the browse request information received in the processing in S21 is not stored (NO in S24), the information output unit 116 does not execute the processing in S25.

As a result, for example, the operation terminal 2 can display each post DT and the property information 131 about each post DT together on the output screen. Therefore, for example, when referring to the content of each post DT, the viewer P2 can confirm certainty of each post DT.

Note that, for example, in a case where the plurality of storage devices 3 corresponding to the browse request information is specified in the processing in S22, the information processing device 1 executes the processing from S23 to S25 on each of the plurality of storage devices 3.

As a result, for example, even in a case where the property information 131 corresponding to the post identification information 133 included in the browse request information is separately stored in the plurality of storage devices 3, the information processing device 1 can acquire the necessary property information 131 from each storage device 3. Therefore, in this case, the operation terminal 2 can display each post DT and the property information 131 corresponding to each post DT together on the output screen.

Furthermore, for example, in the processing in S23, the information determination unit 115 may search for not only the property information 131 corresponding to the post identification information 133 included in the browse request information but also another property information 131 about the generation entity P3 of the property information 131. Then, for example, in the processing in S25, the information output unit 116 may transmit the searched another property information 131 to the operation terminal 2.

Generation Processing According to First Embodiment

Figure 19:
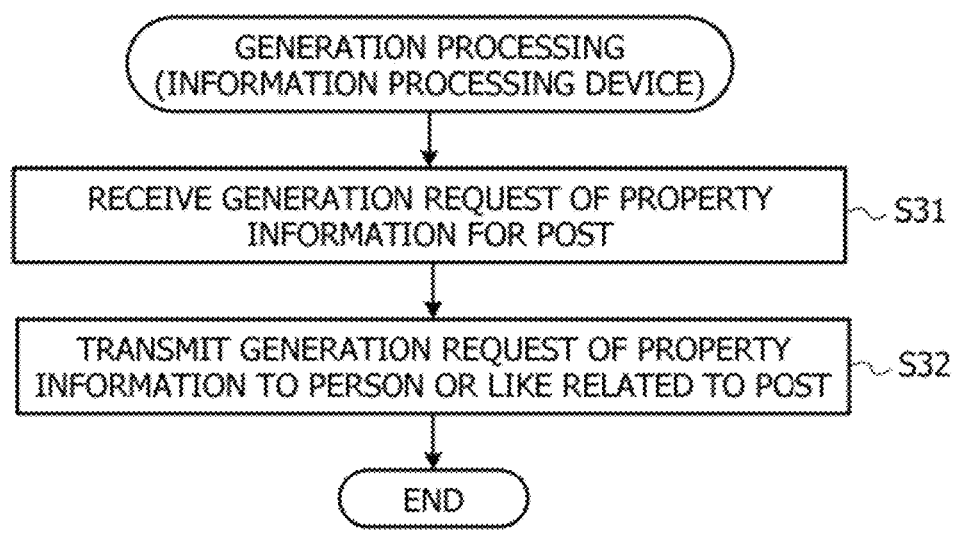
FIG. 19 is a flowchart for explaining generation processing according to the first embodiment.
Figure 20:
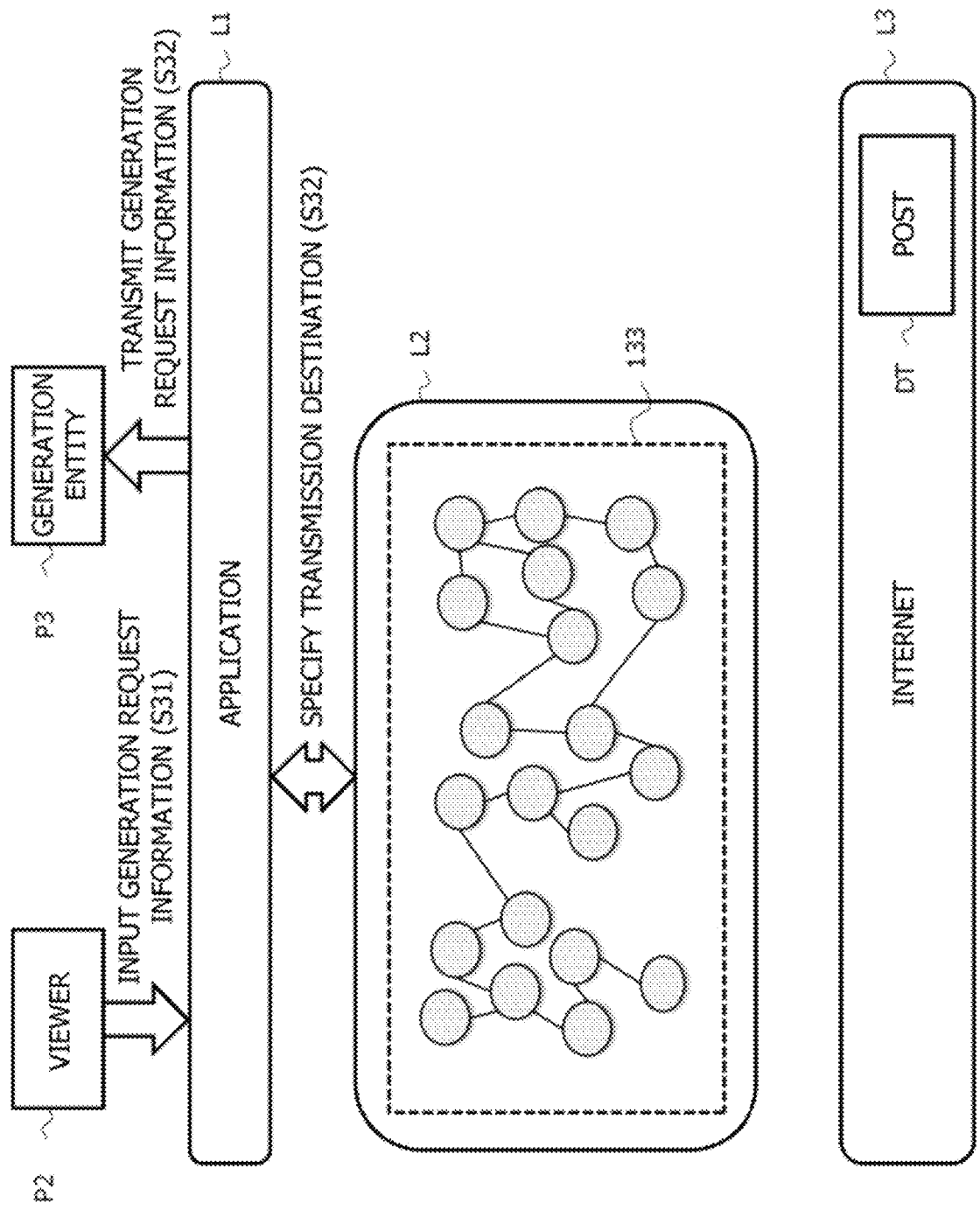
FIG. 20 is a diagram for explaining the generation processing according to the first embodiment.

Next, the generation processing according to the first embodiment will be described. FIG. 19 is a flowchart for explaining the generation processing according to the first embodiment. Furthermore, FIG. 20 is a diagram for explaining the generation processing according to the first embodiment.

As illustrated in FIG. 19, for example, the generation request reception unit 117 receives generation request information about property information 131 transmitted from the operation terminal 2 (S31).

Specifically, for example, in a case where the property information 131 about the post DT does not exist or in a case where the viewer P2 cannot determine the certainty of the content of the post DT even if the viewer P2 refers to the property information 131 about the post DT, the viewer P2 of the post DT specifies a type of the property information 131 (hereinafter, also referred to as specific type) needed to determine the certainty of the content of the post DT. For example, the specific type includes, for example, a type indicating the flood warning level as in the property information 131a described with reference to FIG. 11 or the like, a type indicating the imaging location and the imaging date and time of the image data included in the post DT as in the property information 131c described with reference to FIG. 11 or the like. Then, as illustrated in FIG. 20, for example, the viewer P2 inputs the generation request information about the property information 131 corresponding to the post DT (for example, property information 131 corresponding to post DT that is property information 131 corresponding to specific type) from the operation terminal 2 into the information processing device 1.

Then, for example, the generation request transmission unit 118 transmits the generation request information received in the processing in S31 to the generation entity P3 of the property information 131 corresponding to the generation request information received in the processing in S31 (S32).

Specifically, for example, the generation request transmission unit 118 specifies the generation entity P3 that has been stored in the storage device 3 or the like in advance, as the generation entity P3 corresponding to the type of the property information 131 included in the generation request information. Then, as illustrated in FIG. 20, for example, the generation request transmission unit 118 transmits the generation request information to the specified generation entity P3 (operation terminal 2 of generation entity P3 or the like).

As a result, for example, the information processing device 1 can urge the generation entity P3 to generate the property information 131 necessary for the viewer P2 to confirm the certainty of the post DT. Then, for example, in a case where the property information 131 corresponding to the generation request information is generated, the information processing device 1 can execute processing similar to the addition processing described with reference to FIG. 6 or the like. Therefore, for example, even in a case where the property information 131 about the post DT does not exist or even in a case where it is not possible to determine the certainty of the content of the post DT even if the property information 131 about the post DT (property information 131 that has been stored in storage device 3) is referred, the viewer P2 can browse necessary property information 131 and can confirm the certainty of the post DT.

In this way, the information processing device 1 according to the present embodiment receives, for example, the specific property information 131 indicating the certainty of the specific post DT uploaded over the Internet IN and the specific digital signature generated from the specific property information 131. Then, for example, the information processing device 1 refers to the storage device 4 that stores the correspondence information 132 that associates each post DT with the storage device 3 that stores the information related to each post DT and specifies the specific storage device 3 corresponding to the specific post DT from among the plurality of storage devices 3. Thereafter, for example, the information processing device 1 stores the specific property information 131 to which the post identification information 133 of the specific post DT and the specific digital signature are added, in the specific storage device 3.

Furthermore, for example, in a case of receiving a browse request of the specific property information 131 corresponding to the specific post DT, the information processing device 1 according to the present embodiment refers to the storage device 4 that stores the correspondence information 132 and specifies the specific storage device 3 corresponding to the specific post DT from among the plurality of storage devices 3. Then, for example, the information processing device 1 determines whether or not the specific property information 131 exists with reference to the specific storage device 3, and in a case of determining that the specific property information 131 exists, the information processing device 1 transmits the specific property information 131 to a transmission source of the browse request of the specific property information 131.

In other words, for example, the information processing device 1 according to the present embodiment secures authenticity and non-falsification property of each property information 131 by storing each piece of the property information 131 in a state where the digital signature generated by the generation entity P3 of each piece of the property information 131 is added. Furthermore, for example, the information processing device 1 according to the present embodiment stores each piece of the property information 131 in the storage device 3 determined according to the correspondence information 132 that has been generated in advance.

As a result, for example, in a case of browsing the post DT uploaded over the Internet IN, the viewer P2 can appropriately determine the certainty of the post DT, by referring to the property information 131 about the post DT. Furthermore, for example, even in a case where each piece of the property information 131 is separately stored in the plurality of storage devices 3, the viewer P2 can browse each piece of the property information 131.

Moreover, for example, in a case where another property information 131 corresponding to a person or an object related to the specific post DT has been already stored in the specific storage device 3, the information processing device 1 according to the present embodiment stores the specific property information 131 corresponding to the specific post DT and the another property information 131 in association with each other.

In other words, for example, when storing each property information 131 in the storage device 3, the information processing device 1 according to the present embodiment forms a graph structure by associating with another property information 131 about the generation entity P3 of each property information 131 and another property information 131 about an object of the post DT corresponding to each property information 131.

As a result, for example, even in a case where it is not possible to determine the certainty of each post DT from the content of the property information 131 about each post DT, the viewer P2 can retroactively confirm the other pieces of property information 131 related to each post DT in order and can determine the certainty of each post DT.

Furthermore, the information processing device 1 according to the present embodiment manages the graph information 134 in the endorsement layer L2 different from the Internet layer L3, for example. Therefore, for example, the information processing device 1 can execute the information management processing without affecting upload and browsing of the post DT in the Internet layer L3.

Note that, for example, when generating the property information 131 with the operation terminal 2, the generation entity P3 may generate encrypted data from the property information 131 by using a secret key of its own (generation entity P3). Then, for example, the operation terminal 2 may transmit property information 131 to which the encrypted data is added as the digital signature to the information processing device 1.

Furthermore, for example, in a case of browsing the property information 131 (hereinafter, also referred to as property information 131 to be browsed) with the operation terminal 2, the viewer P2 may confirm authenticity and non-falsification property of the property information 131 to be browsed, by decrypting the encrypted data that is the digital signature using a public key of the property information 131 to be browsed. Specifically, in this case, the viewer P2 may decrypt the property information 131 to be browsed, for example, by specifying a generation entity P3 about the property information 131 to be browsed and using a public key corresponding to the specified generation entity P3.

Modification According to First Embodiment

Next, a modification (hereinafter, also referred to as first modification) according to the first embodiment will be described. FIGS. 21 to 25 are diagrams for explaining information management processing according to the first modification.

In the information management processing in the first embodiment, a case has been described where the correspondence information 132 is stored in the single storage device 4. On the other hand, in the information management processing in the first modification, a case will be described where the correspondence information 132 is separately stored in the plurality of storage devices 4.

Configuration of Information Processing System According to First Modification

Figure 21:
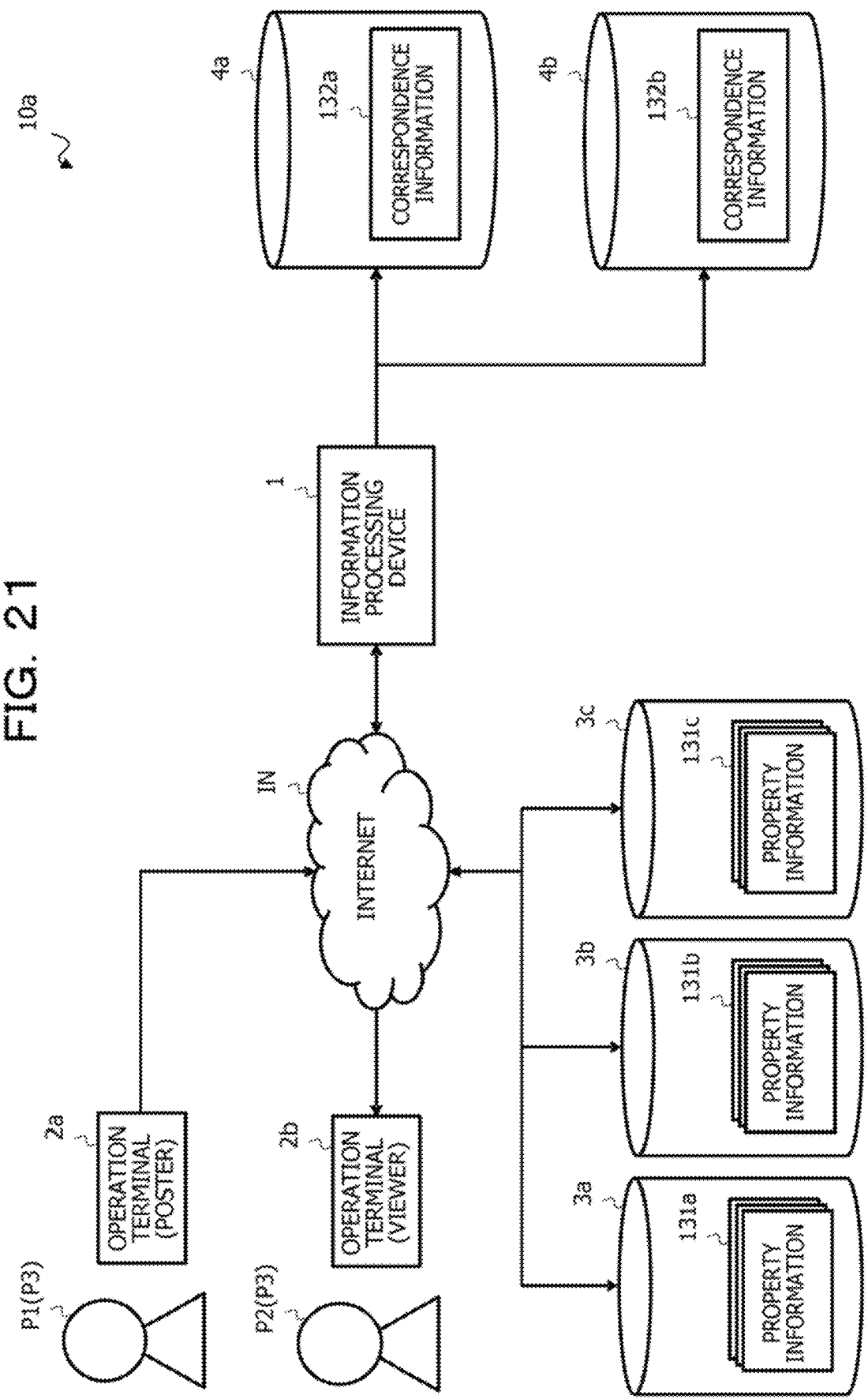
FIG. 21 is a diagram for explaining a configuration of an information processing system 10a according to a first modification.

First, a configuration of an information processing system 10 according to the first modification (hereinafter, also referred to as information processing system 10a) will be described. FIG. 21 is a diagram for explaining the configuration of the information processing system 10a according to the first modification.

The information processing system 10a illustrated in FIG. 21 includes the plurality of storage devices 4, unlike a case of the information processing system 10 described with reference to FIG. 1. Specifically, the information processing system 10a illustrated in FIG. 21 includes a storage device 4a and a storage device 4b.

The storage device 4a stores, for example, a part of the correspondence information 132 described in the first embodiment (hereinafter, also referred to as correspondence information 132a). Furthermore, for example, the storage device 4b stores another part of the correspondence information 132 described in the first embodiment (hereinafter, also referred to as correspondence information 132b). Hereinafter, a case will be described where the two storage devices 4 (storage devices 4a and 4b) are included in the information processing system 10a. However, the information processing system 10a may include, for example, three or more storage devices 3.

Specifically, each of the correspondence information 132a and the correspondence information 132b may be, for example, each piece of the correspondence information 132 divided for each generation entity P3 of each piece of the property information 131. Furthermore, each of the correspondence information 132a and the correspondence information 132b may be, for example, each correspondence information 132 divided for each affiliation organization (for example, school, company, or the like) of the generation entity P3 of each piece of the property information 131.

In other words, the information processing device 1 according to the first modification stores, for example, each piece of the correspondence information 132 in each storage device 4 that can be managed by each generation entity P3 or the affiliation organization of each generation entity P3.

As a result, for example, each generation entity P3 can manage the correspondence information 132 about each generation entity P3 by oneself and can change the correspondence information 132 as necessary, for example.

Figure 22:
FIG. 22 is a diagram for explaining information management processing according to the first modification.

Note that, in the information management processing according to the first modification, as illustrated in FIG. 22, for example, a decentralized identifier (DID) may be used as identification information of each post DT (post identification information 133) and identification information DO of each generation entity P3. Furthermore, in the information management processing according to the first modification, in this case, for example, a verifiable data registry (VDR) may be used as the storage device 4.

Specifically, in this case, a DID document corresponding to each post DT may be generated by a content server and stored in the VDR, for example. Furthermore, the DID document corresponding to each generation entity P3 may be generated by each generation entity P3 and stored in the VDR, for example.

More specifically, in this case, the content server and the generation entity P3 (hereinafter, these are also collectively referred to as generation entity P3 or the like) may generate a DID document D2 illustrated in FIG. 24, by adding location information D2a including a URL of each DID document D1 to the DID document D1 illustrated in FIG. 23, for example.

Note that the DID document D2 illustrated in FIG. 24 includes, for example, a public key (hereinafter, also simply referred to as public key) of a digital signature includes in property information 131 corresponding to the DID document D2. In other words, for example, the generation entity P3 or the like may store the URL (location information D2a) of the storage device 3 that stores each piece of the property information 131 and the public key corresponding to each piece of the property information 131 in association with each other, in the VDR.

Specific Example of Processing in S22 in A Case Where DID Is Used

Figure 25:
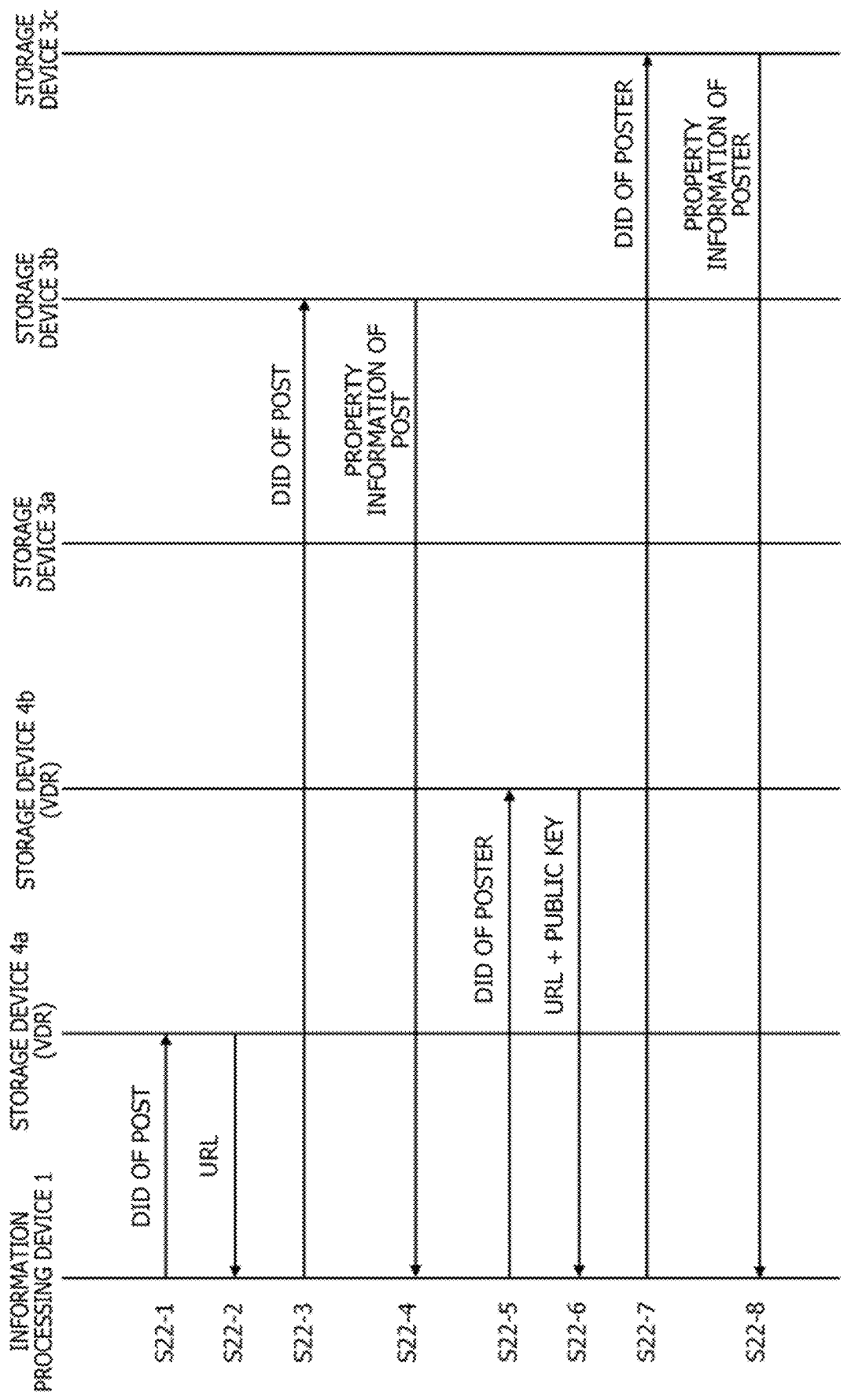
FIG. 25 is a diagram for explaining a specific example of processing in S22 in a case where a DID is used.

Next, a specific example of the processing in S22 in a case where the DID is used will be described. FIG. 25 is a diagram for explaining the specific example of the processing in S22 in a case where the DID is used.

For example, in a case of receiving browse request information (hereinafter, also referred to as first browse request information) of property information 131 (hereinafter, also referred to as first property information 131) corresponding to a post DT from an operation terminal 2, as illustrated in FIG. 25, the information processing device 1 accesses a VDR (storage device 4a) corresponding to a DID included in the first browse request information and acquires a URL corresponding to the DID included in the first browse request information (S22-1, S22-2).

Then, for example, the information processing device 1 accesses a storage device 3 (storage device 3b) indicated by the acquired URL and acquires the first property information 131 (first property information 131 corresponding to first browse request information) (S22-3, S22-4). Subsequently, for example, the information processing device 1 displays the acquired first property information 131 on an output screen. Thereafter, for example, the viewer P2 browses the first property information 131 displayed on the output screen.

Moreover, for example, in a case of receiving browse request information (hereinafter, also referred to as second browse request information) of property information 131 (hereinafter, also referred to as second property information 131) of a poster P1 (generation entity P3 of first property information 131) from the operation terminal 2, the information processing device 1 accesses a VDR (storage device 4b) corresponding to a DID included in the second browse request information and acquires a URL corresponding to the DID included in the second browse request information (S22-5, S22-6).

Here, for example, the information processing device 1 also acquires a public key of a digital signature included in the first property information 131 from the VDR (storage device 4b) (S22-6). Then, for example, the viewer P2 confirms authenticity and non-falsification property of the first property information 131 by using the public key acquired by the information processing device 1.

Next, for example, the information processing device 1 accesses a storage device 3 (storage device 3c) indicated by the acquired URL and acquires second property information 131 (second property information 131 corresponding to second browse request information) (S22-7, S22-8). Then, for example, the information processing device 1 displays the acquired second property information 131 on the output screen. Thereafter, for example, the viewer P2 browses the second property information 131 displayed on the output screen.

As a result, for example, even in a case where the DID is used, the information processing device 1 can acquire each piece of necessary property information 131 from each storage device 3. Therefore, even in this case, for example, the operation terminal 2 can display each post DT and the property information 131 about each post DT together on the output screen.

Another Modification According to First Embodiment

Figure 26:
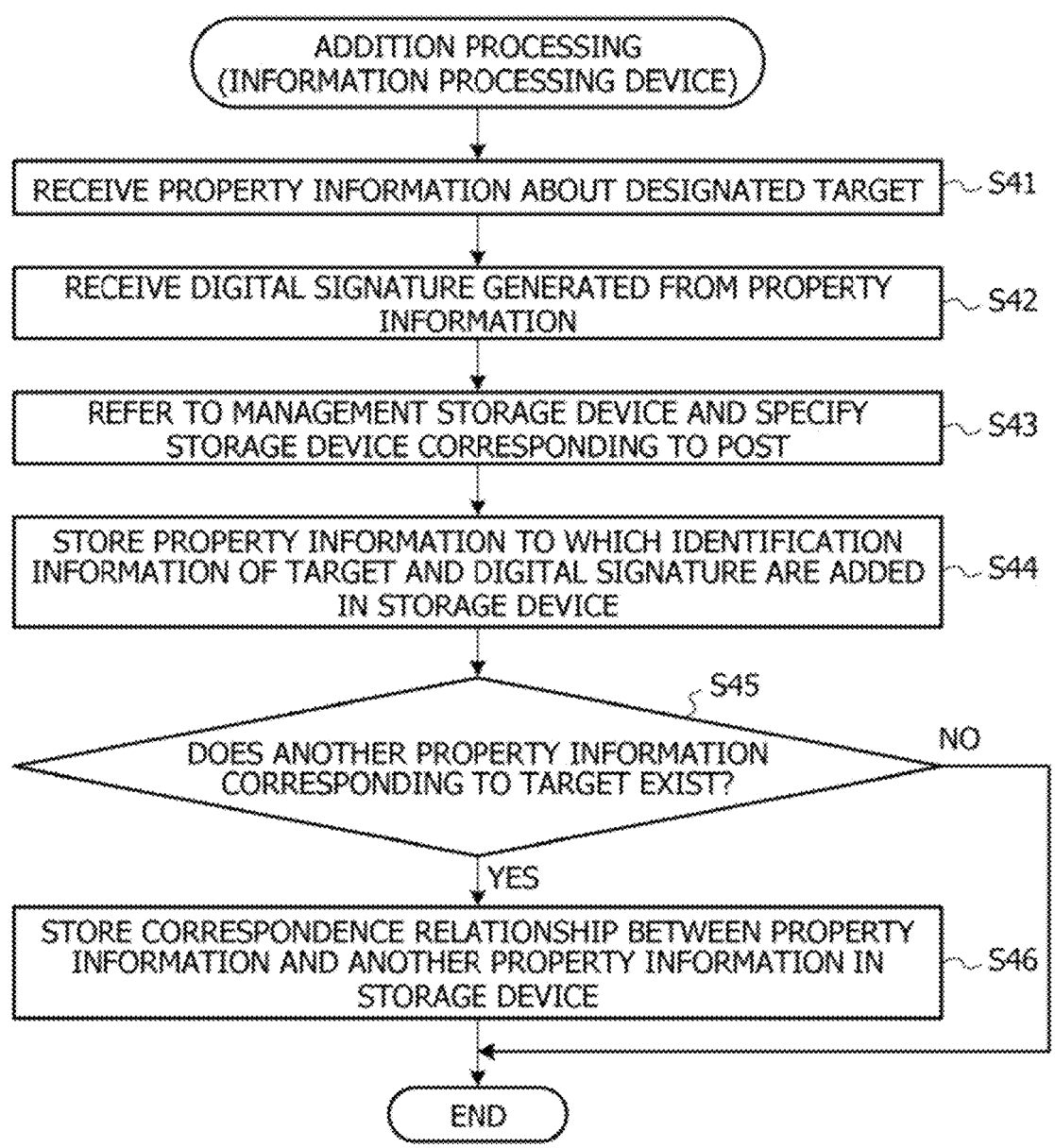
FIG. 26 is a flowchart for explaining addition processing according to a second modification.
Figure 29:
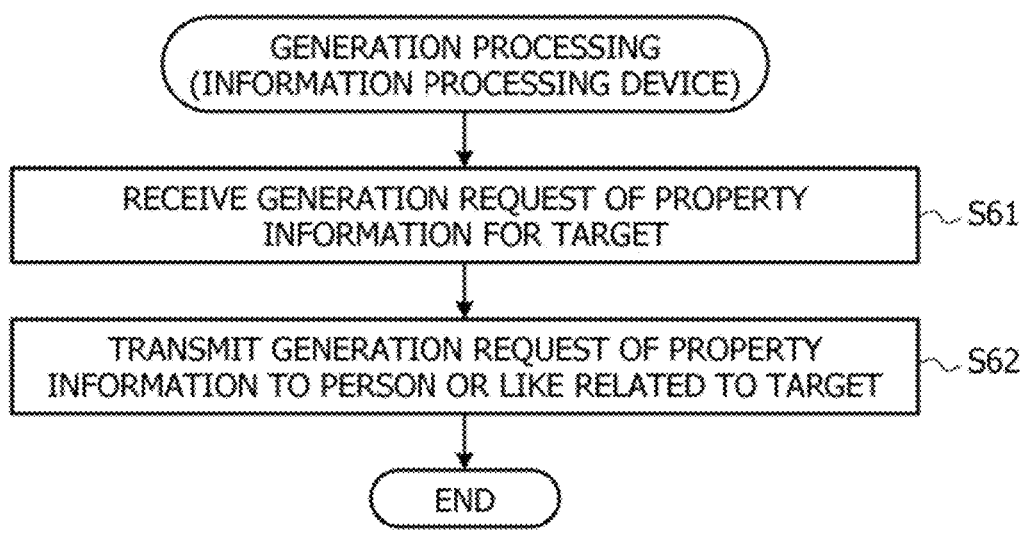
FIG. 29 is a flowchart for explaining generation processing according to the second modification.

Next, another modification (hereinafter, also referred to as second modification) according to the first embodiment will be described. FIGS. 26 and 29 are diagrams for explaining information management processing according to the second modification.

In the information management processing according to the first embodiment, a case has been described where each post DT uploaded over the Internet IN and each piece of the property information 131 are associated and the plurality of pieces of property information 131 is associated with each other. On the other hand, in the information management processing according to the second modification, a case will be described where each post DT and each piece of the property information 131 are not associated.

Addition Processing According to Second Modification

Figure 27:
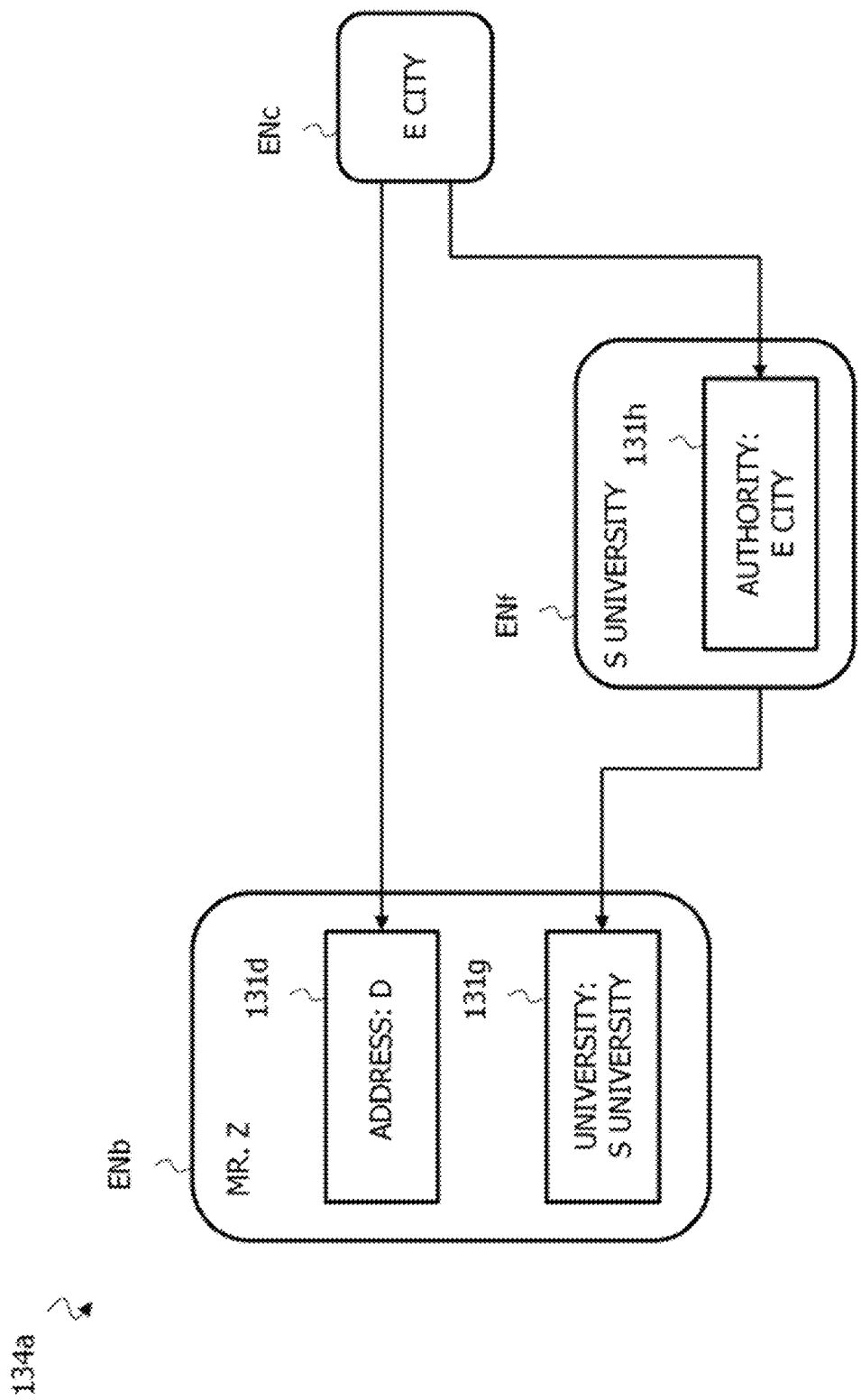
FIG. 27 is a diagram for explaining the addition processing according to the second modification.

First, addition processing according to the second modification will be described. FIG. 26 is a flowchart for explaining the addition processing according to the second modification. Furthermore, FIG. 27 is a diagram for explaining the addition processing according to the second modification.

As illustrated in FIG. 26, for example, the information reception unit 111 receives property information 131 transmitted from the operation terminal 2 (S41). Specifically, for example, unlike a case of the first embodiment, the information reception unit 111 receives property information 131 about a target (hereinafter, also referred to as verification target) such as a person designated in advance. Furthermore, for example, the information reception unit 111 receives a digital signature generated from the property information 131 with the operation terminal 2, from the operation terminal 2 (S42).

Then, for example, the storage destination specification unit 112 refers to the storage device 4 that stores the correspondence information 132 and specifies a storage device 3 associated with the verification target corresponding to the property information 131 received in the processing in S41 from among the plurality of storage devices 3 (S43).

Subsequently, for example, the information management unit 113 stores information in which identification information of the verification target corresponding to the property information 131 received in the processing in S41, the digital signature received in the processing in S42, and the property information 131 received in the processing in S41 are associated, in the storage device 3 specified in the processing in S43 (S44).

Thereafter, for example, the information management unit 113 determines whether or not another property information 131 corresponding to the property information 131 received in the processing in S41 is stored in the storage device 3 specified in the processing in S43 (S45). Specifically, for example, the information management unit 113 determines whether or not the another property information 131 about the generation entity P3 of the property information 131 received in the processing in S41 is stored.

As a result, in a case of determining that the another property information 131 corresponding to the property information 131 received in the processing in S41 is stored (YES in S45), for example, the information management unit 113 stores the property information 131 received in the processing in S41 and the another property information 131 that is determined to be stored in the storage device 3 in the processing in S45 in association with each other, in the storage device 3 specified in the processing in S43 (S46).

On the other hand, in a case of determining that the another property information 131 corresponding to the property information 131 received in the processing in S41 is not stored (NO in S45), the information management unit 113 does not execute the processing in S46, for example. Hereinafter, a specific example of graph information 134 according to the second modification will be described.

As a result, for example, when confirming certainty of property information 131 about the verification target, a verifier of the property information 131 about the verification target (hereinafter, also simply referred to as verifier) can also refer to property information 131 (another property information 131) about a generation entity P3 of the property information 131 about the verification target and can determine the certainty of the property information 131 about the verification target.

Specific Example of Graph Information

FIG. 27 is a diagram for explaining the specific example of the graph information 134. Hereinafter, description will be made as assuming that property information 131d in FIG. 27 corresponds to the property information 131d described with reference to FIG. 11. Furthermore, hereinafter, description will be made as assuming that an entity ENb in FIG. 27 corresponds to the entity ENb described with reference to FIG. 11. Moreover, hereinafter, description will be made as assuming that an entity ENc in FIG. 27 corresponds to the entity ENc described with reference to FIG. 11. Moreover, hereinafter, description will be made as assuming that the verification target is Mr. Z.

In the graph information 134 illustrated in FIG. 27, for example, the property information 131d and property information 131g are associated as property information 131 for Mr. Z (verification target). Then, the property information 131g illustrated in FIG. 27 is associated with, for example, an entity ENf indicating that a generation entity P3 of the property information 131g is S university. Furthermore, property information 131h illustrated in FIG. 27 is associated with, for example, the entity ENc indicating that a generation entity P3 of property information 131h is E city.

In other words, as illustrated in FIG. 27, the graph information 134 does not need to include, for example, the post identification information 133 corresponding to the post DT and the property information 131 corresponding to the post DT. In other words, as illustrated in FIG. 27, for example, the graph information 134 may include the property information 131 and the entity related to the verification target.

Then, in this case, for example, in a case where the verifier browses the property information 131 about the verification target, the verifier specifies the generation entity P3 of the property information 131 about the verification target (property information 131g) and further refers to the property information 131 (property information 131h) about the specified generation entity P3, so as to appropriately determine certainty of each piece of information included in the property information 131 about the verification target (for example, address, university, or the like of Mr. Z).

As a result, for example, the verifier can confirm the certainty of each piece of the information (for example, university or the like of Mr. Z) included in the property information 131 about the verification target in browsing processing to be described later.

[Browsing Processing According to Second Modification]

Figure 28:
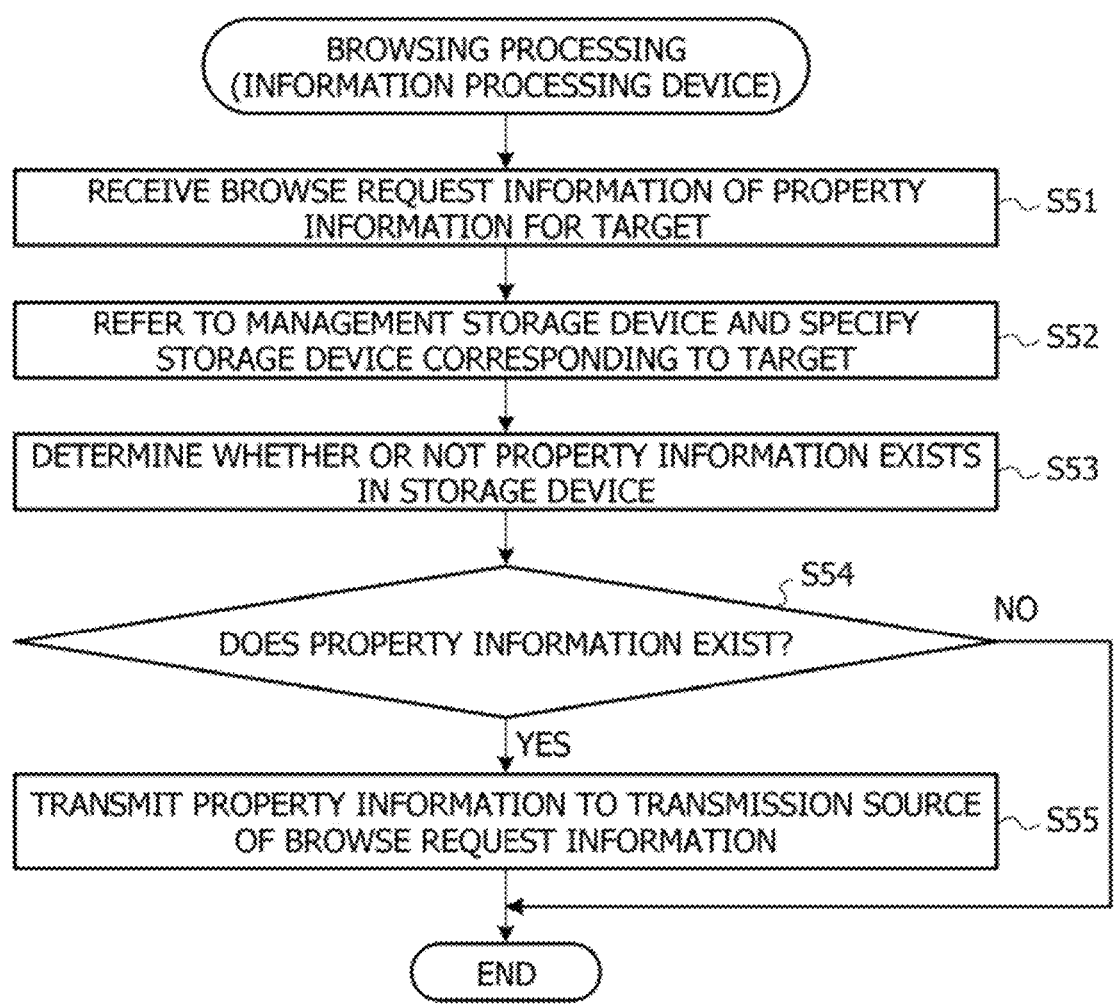
FIG. 28 is a flowchart for explaining browsing processing according to the second modification.

Next, the browsing processing according to the second modification will be described. FIG. 28 is a flowchart for explaining the browsing processing according to the second modification.

As illustrated in FIG. 28, for example, the browse request reception unit 114 receives browse request information about property information 131 transmitted from the operation terminal 2 (S51). Specifically, for example, the browse request reception unit 114 receives the browse request information of the property information 131 about the verification target.

Then, for example, the storage destination specification unit 112 refers to the storage device 4 that stores the correspondence information 132 and specifies a storage device 3 corresponding to the browse request information received in the processing in S51 (S52).

Thereafter, for example, the information determination unit 115 accesses the storage device 3 specified in the processing in S52 and determines whether or not the property information 131 corresponding to the browse request information received in the processing in S51 is stored (S53).

As a result, for example, in a case where it is determined that the property information 131 corresponding to the browse request information received in the processing in S51 is stored (YES in S54), the information output unit 116 acquires the property information 131 corresponding to the browse request information received in the processing in S51 from the storage device 3 (storage device 3 specified in processing in S52) and transmits the acquired property information 131 to the operation terminal 2 (operation terminal 2 that has transmitted browse request information) (S55). Thereafter, for example, the operation terminal 2 displays the property information 131 transmitted from the information processing device 1 (property information 131 corresponding to browse request information) on an output screen.

On the other hand, for example, in a case where it is determined that the property information 131 corresponding to the browse request information received in the processing in S51 is not stored (NO in S54), the information output unit 116 does not execute the processing in S55.

As a result, for example, the verifier can appropriately refer to the property information 131 about the verification target.

[Generation Processing According to Second Modification]

Next, generation processing according to the second modification will be described. FIG. 29 is a flowchart for explaining the generation processing according to the second modification.

As illustrated in FIG. 29, for example, the generation request reception unit 117 receives generation request information about property information 131 transmitted from the operation terminal 2 (S61). Specifically, for example, the generation request reception unit 117 receives the generation request information of the property information 131 about the verification target.

Then, for example, the generation request transmission unit 118 transmits the generation request information received in the processing in S61 to the generation entity P3 of the property information 131 corresponding to the generation request information received in the processing in S61 (S62).

As a result, for example, when confirming certainty of the property information 131 about the verification target, the verifier can appropriately request to generate another property information 131 to be needed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information management program for causing a computer to execute processing comprising:
    referring to a management storage device that stores correspondence information that associates each post with a storage device that stores information related to each post and specifying a specific storage device that corresponds to a specific post from among a plurality of storage devices, in a case of receiving a browse request of specific property information that indicates certainty of the specific post uploaded over the Internet;
    referring to the specific storage device and determining whether the specific property information exists; and
    transmitting the specific property information to a transmission source of the browse request in a case of determining that the specific property information exists,
    the processing further comprising:
    receiving first property information that corresponds to a first post uploaded over the Internet and a digital signature generated from the first property information;
    referring to the management storage device and specifying a first storage device that corresponds to the first post from among the plurality of storage devices; and
    storing the first property information to which identification information of the first post and the digital signature generated from the first property information are added, in the first storage device.

2. The non-transitory computer-readable recording medium according to claim 1, wherein
    in a case where another property information that corresponds to a person or an object related to the first post is stored in the first storage device, the storing of the first property information stores the first property information and the another property information in association with each other.

3. The non-transitory computer-readable recording medium according to claim 1, the processing further comprising:
    in a case of receiving a generation request of second property information that corresponds to a second post uploaded over the Internet, transmitting the generation request of the second property information to a transmission destination that corresponds to a person or an object related to the second post;
    in a case of receiving the second property information and a digital signature generated from the second property information, referring to the management storage device and specifying a second storage device that corresponds to the second post from among the plurality of storage devices; and
    storing the second property information to which identification information of the second post and the digital signature generated from the second property information are added, in the second storage device.

4. A non-transitory computer-readable recording medium storing an information management program for causing a computer to execute processing comprising:
    referring to a management storage device that stores correspondence information that associates each target with a storage device that stores information related to each target and specifying a specific storage device that corresponds to a specific target from among a plurality of storage devices, in a case of receiving a browse request of specific property information that indicates an attribute of the specific target;
    referring to the specific storage device and determining whether or not the specific property information exists; and
    transmitting the specific property information to a transmission source of the browse request in a case of determining that the specific property information exists,
    the processing further comprising:
    receiving first property information that indicates an attribute of a first target and a digital signature generated from the first property information;
    referring to the management storage device and specifying a first storage device that corresponds to the first target from among the plurality of storage devices; and
    storing the first property information to which identification information of the first target and the digital signature generated from the first property information are added, in the first storage device.

5. The non-transitory computer-readable recording medium according to claim 4, wherein
    in a case where another property information that corresponds to a person or an object related to the first target is stored in the first storage device, the storing of the first property information stores the first property information and the another property information in association with each other.

6. The non-transitory computer-readable recording medium according to claim 4, the processing further comprising:
- in a case of receiving a generation request of second property information that corresponds to a second target, transmitting the generation request of the second property information to a transmission destination that corresponds to a person or an object related to the second target;
- in a case of receiving the second property information and a digital signature generated from the second property information, referring to the management storage device and specifying a second storage device that corresponds to the second target from among the plurality of storage devices; and
- storing the second property information to which identification information of the second target and the digital signature generated from the second property information are added, in the second storage device.

7. An information processing system comprising:
an information processing device; and
an operation terminal capable of accessing the information processing device, wherein
the information processing device includes a processor configured to:
- refer to a management storage device that stores correspondence information that associates each post with a storage device that stores information related to each post and specifies a specific storage device that corresponds to the specific post from among a plurality of storage devices, in a case of receiving a browse request of specific property information that indicates certainty of a specific post uploaded over the Internet from the operation terminal,
- refer to the specific storage device to determine whether the specific property information exists, and
- transmit the specific property information to a transmission source of the browse request in a case of determining that the specific property information exists, the processing further comprising:
- receiving first property information that corresponds to a first post uploaded over the Internet and a digital signature generated from the first property information;
- referring to the management storage device and specifying a first storage device that corresponds to the first post from among the plurality of storage devices; and
- storing the first property information to which identification information of the first post and the digital signature generated from the first property information are added, in the first storage device.

8. An information processing system comprising:
an information processing device; and
an operation terminal capable of accessing the information processing device, wherein
the information processing device includes a processor configured to:
- refer to a management storage device that stores correspondence information that associates each target with a storage device that stores information related to each target and specifies a specific storage device that corresponds to a specific target from among a plurality of storage devices, in a case of receiving a browse request of specific property information that indicates an attribute of the specific target from the operation terminal; and
- refer to the specific storage device to determine whether the specific property information exists, and
- transmit the specific property information to a transmission source of the browse request in a case of determining that the specific property information exists, the processing further comprising:
- receiving first property information that indicates an attribute of a first target and a digital signature generated from the first property information;
- referring to the management storage device and specifying a first storage device that corresponds to the first target from among the plurality of storage devices; and
- storing the first property information to which identification information of the first target and the digital signature generated from the first property information are added, in the first storage device.

9. An information management method implemented by a computer, the information management method comprising:
- referring to a management storage device that stores correspondence information that associates each post with a storage device that stores information related to each post and specifying a specific storage device that corresponds to a specific post from among a plurality of storage devices, in a case of receiving a browse request of specific property information that indicates certainty of the specific post uploaded over the Internet;
- referring to the specific storage device and determining whether the specific property information exists; and
- transmitting the specific property information to a transmission source of the browse request in a case of determining that the specific property information exists, the processing further comprising:
- receiving first property information that corresponds to a first post uploaded over the Internet and a digital signature generated from the first property information;
- referring to the management storage device and specifying a first storage device that corresponds to the first post from among the plurality of storage devices; and
- storing the first property information to which identification information of the first post and the digital signature generated from the first property information are added, in the first storage device.

10. An information management method implemented by a computer, the information management method comprising:
- referring to a management storage device that stores correspondence information that associates each target with a storage device that stores information related to each target and specifying a specific storage device that corresponds to a specific target from among a plurality of storage devices, in a case of receiving a browse request of specific property information that indicates an attribute of the specific target;
- referring to the specific storage device and determining whether the specific property information exists; and
- transmitting the specific property information to a transmission source of the browse request in a case of determining that the specific property information exists, the processing further comprising:
- receiving first property information that indicates an attribute of a first target and a digital signature generated from the first property information;
- referring to the management storage device and specifying a first storage device that corresponds to the first target from among the plurality of storage devices; and
- storing the first property information to which identification information of the first target and the digital signature generated from the first property information are added, in the first storage device.

* * * * *